United States Patent
Shin et al.

(10) Patent No.: US 10,237,862 B2
(45) Date of Patent: *Mar. 19, 2019

(54) METHOD FOR RECEIVING SYSTEM INFORMATION IN WIRELESS COMMUNICATION SYSTEM THAT SUPPORTS NARROWBAND IOT AND APPARATUS FOR THE SAME

(71) Applicant: LG ELECTRONICS INC., Seoul (KR)

(72) Inventors: Seokmin Shin, Seoul (KR); Hyunsoo Ko, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,349

(22) Filed: Feb. 24, 2017

(65) Prior Publication Data

US 2017/0251443 A1 Aug. 31, 2017

Related U.S. Application Data

(60) Provisional application No. 62/300,076, filed on Feb. 26, 2016, provisional application No. 62/304,315, (Continued)

(51) Int. Cl.
*H04W 56/00* (2009.01)
*H04W 72/04* (2009.01)
*H04L 29/08* (2006.01)

(52) U.S. Cl.
CPC .......... *H04W 72/042* (2013.01); *H04L 67/12* (2013.01); *H04W 56/0015* (2013.01)

(58) Field of Classification Search
CPC .. H04W 56/00; H04W 56/0015; H04L 29/08; H04L 67/12
See application file for complete search history.

(56) References Cited

U.S. PATENT DOCUMENTS

2009/0262710 A1* 10/2009 Doi ...................... H04W 56/001
370/336
2016/0330378 A1* 11/2016 Tsuchiya ................ G03B 17/14
(Continued)

FOREIGN PATENT DOCUMENTS

WO 2015179499 11/2015
WO 2015193849 12/2015

OTHER PUBLICATIONS

U.S. Appl. No. 15/441,125, Office Action dated Jul. 26, 2018, 15 pages.
(Continued)

*Primary Examiner* — Chi Ho A Lee
(74) *Attorney, Agent, or Firm* — Lee, Hong, Degerman, Kang & Waimey

(57) ABSTRACT

A method for receiving system information performed by a terminal in a wireless communication system that supports Narrow Band (NB)-Internet of Things (IoT) includes receiving a Narrowband Synchronization Signal from a base station through narrowband (NB); acquiring time synchronization and frequency synchronization with the base station based on the Narrowband Synchronization Signal; and receiving the system information related to the NB-IoT from the base station through a Narrowband Physical Broadcast Channel (N-PBCH).

20 Claims, 21 Drawing Sheets

Related U.S. Application Data filed on Mar. 6, 2016, provisional application No. 62/354,827, filed on Jun. 27, 2016, provisional application No. 62/356,508, filed on Jun. 29, 2016.

(56) References Cited

U.S. PATENT DOCUMENTS

| | | | |
|---|---|---|---|
| 2017/0094621 A1* | 3/2017 | Xu | H04W 56/001 |
| 2017/0230962 A1 | 8/2017 | Park et al. | |
| 2017/0251443 A1 | 8/2017 | Shin et al. | |
| 2017/0251455 A1 | 8/2017 | Shin et al. | |
| 2017/0373900 A1* | 12/2017 | Adhikary | H04L 27/2613 |
| 2018/0287846 A1 | 10/2018 | Kim et al. | |

OTHER PUBLICATIONS

United States Patent and Trademark Office U.S. Appl. No. 15/441,125, Notice of Allowance dated Nov. 29, 2018, 13 pages.

* cited by examiner

[Figure 1]
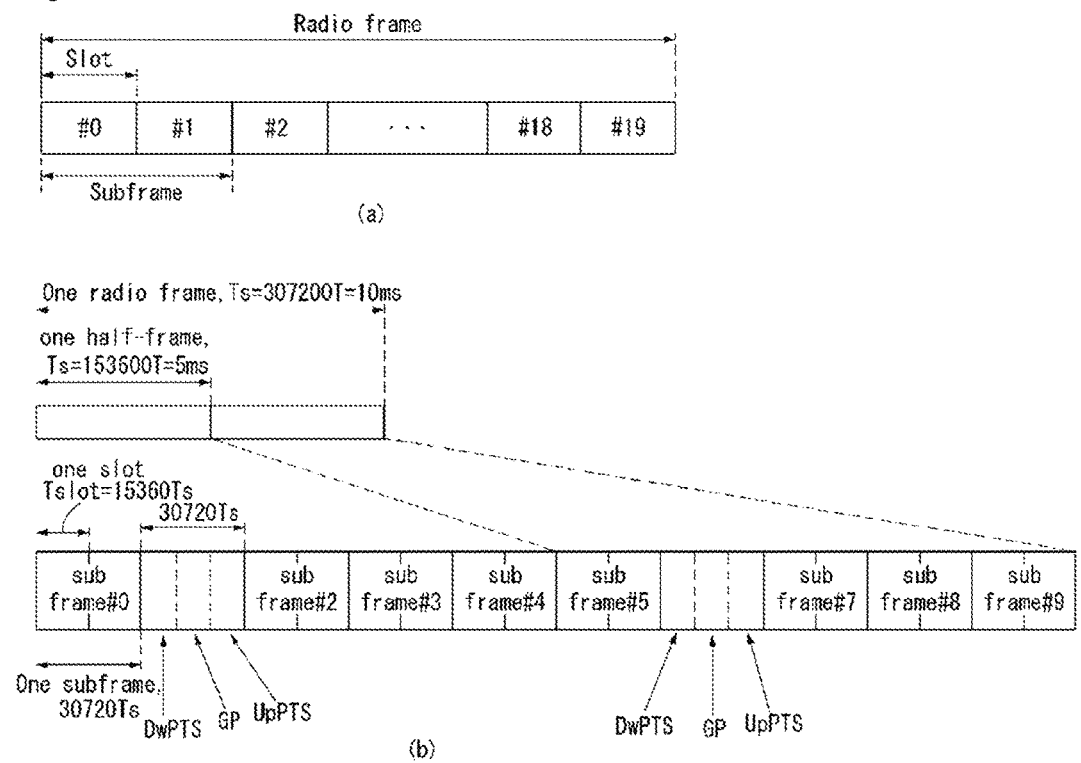

[Figure 2]
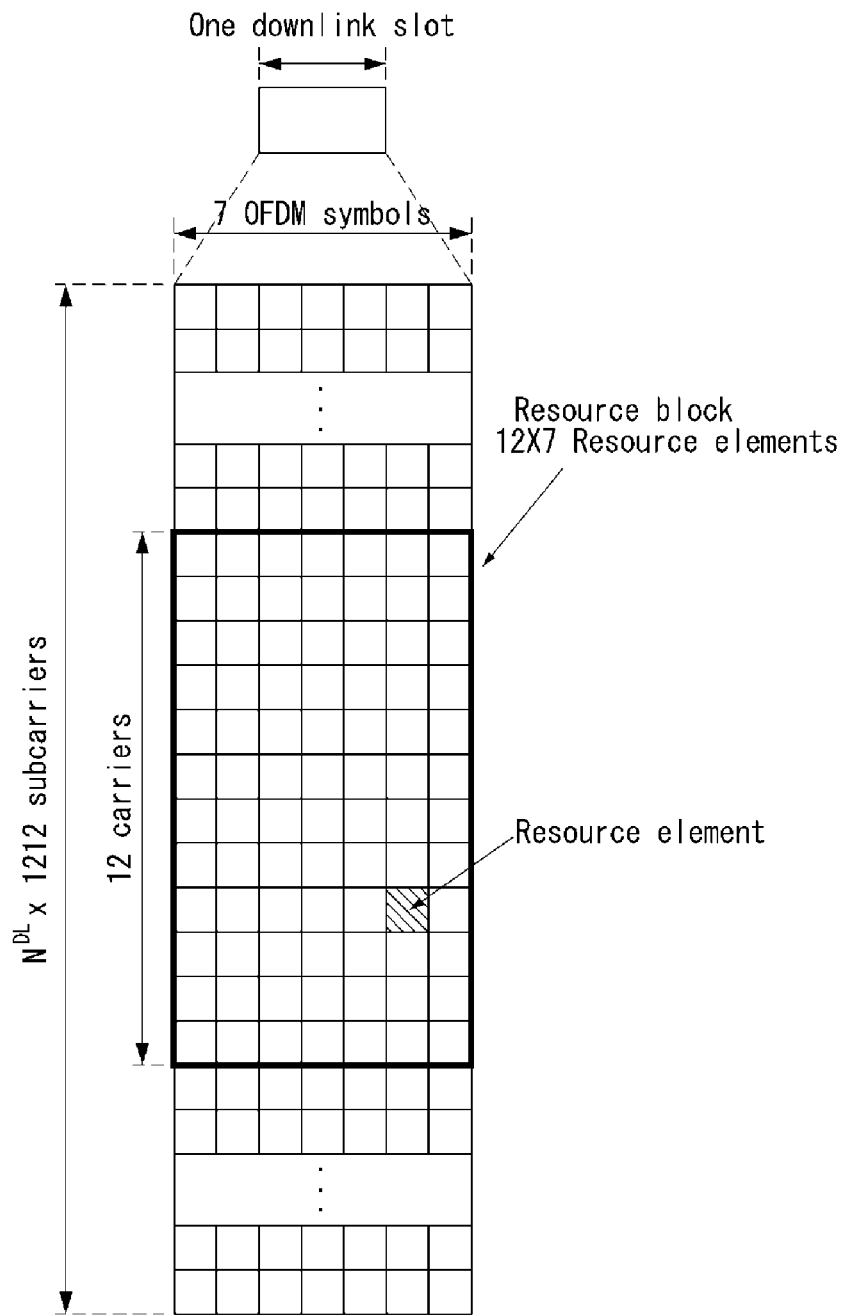

[Figure 3]
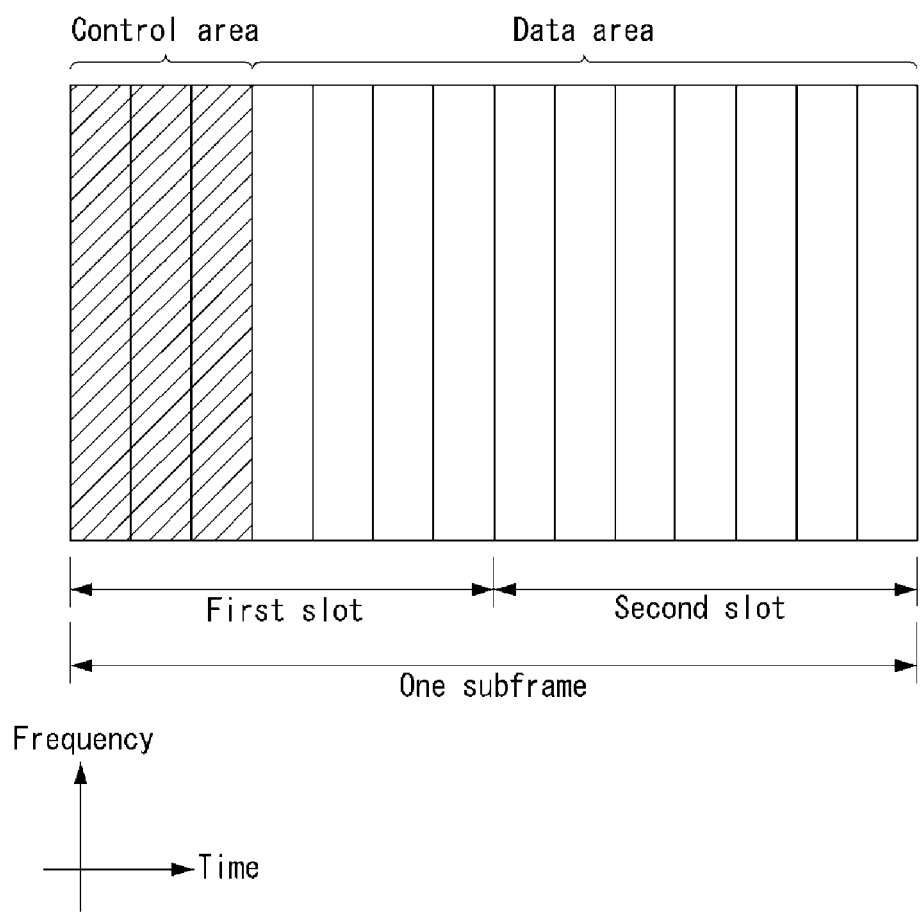

[Figure 4]
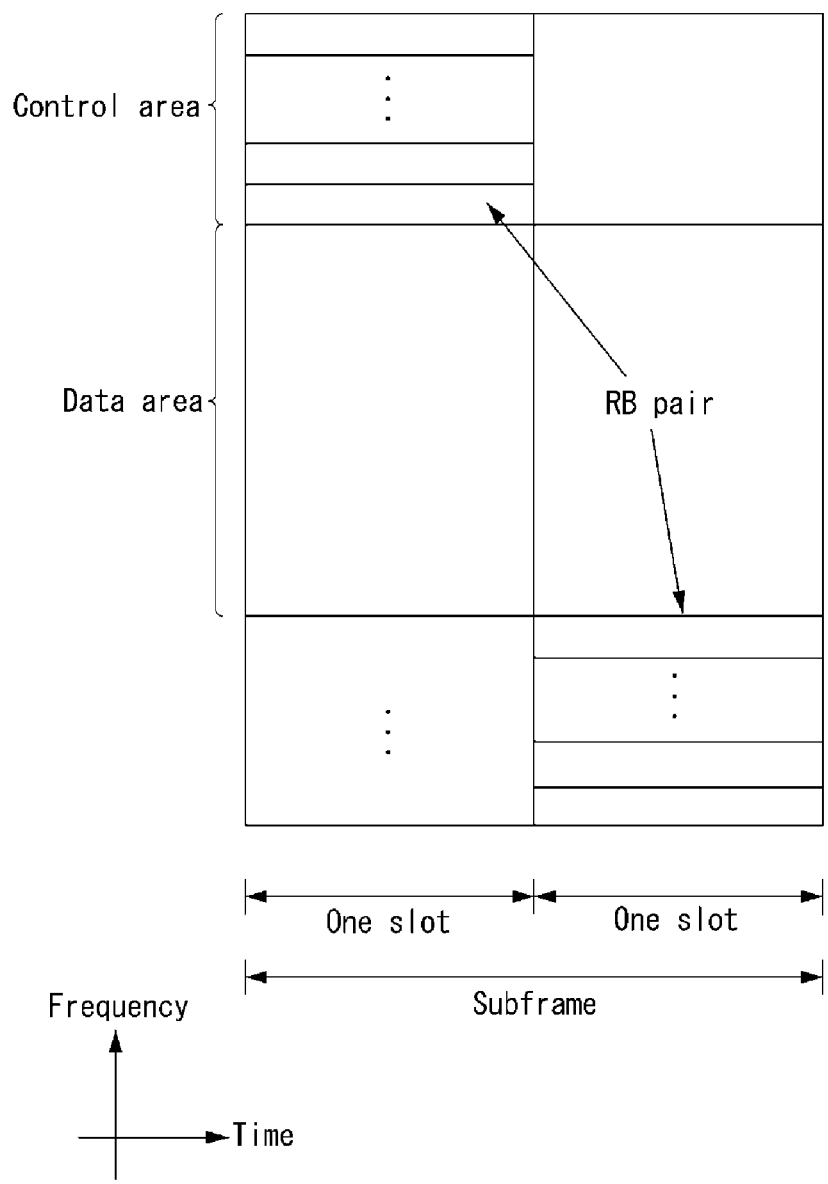

[Figure 5]
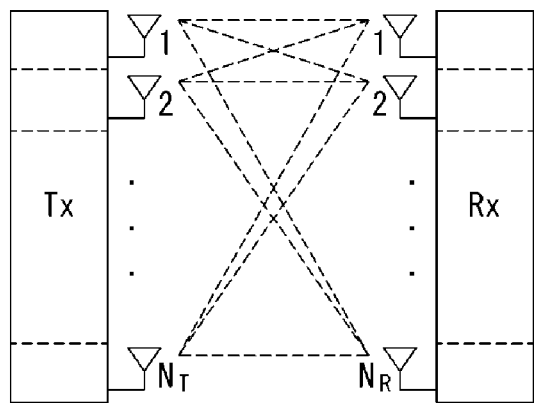
[Figure 6]
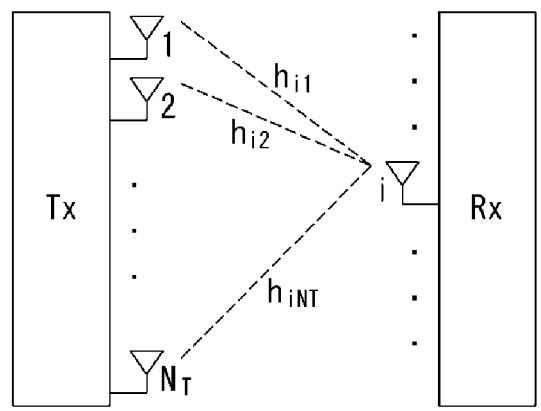

[Figure 7]
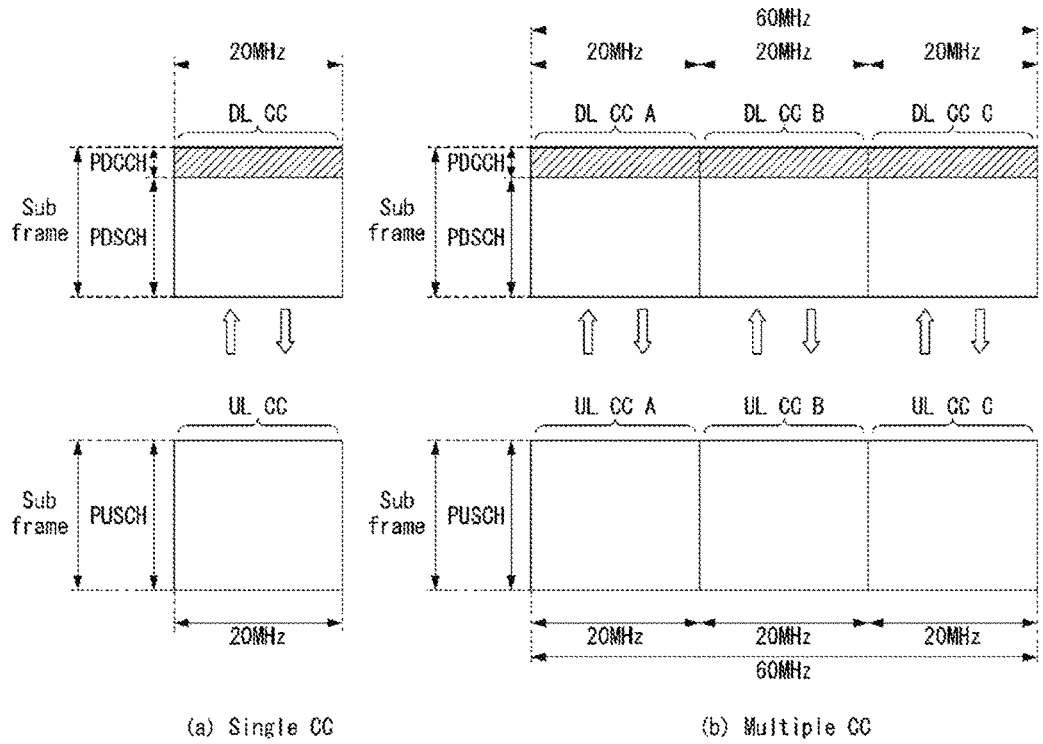
(a) Single CC  (b) Multiple CC
[Figure 8]
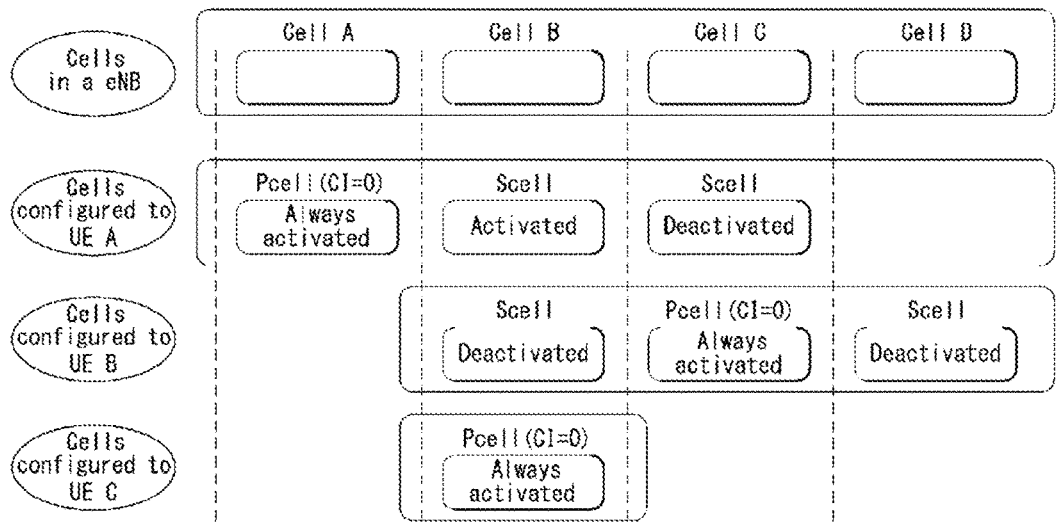

[Figure 9]
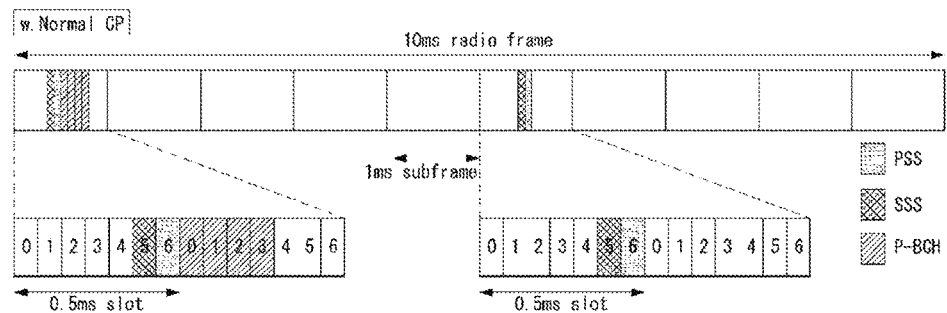
[Figure 10]
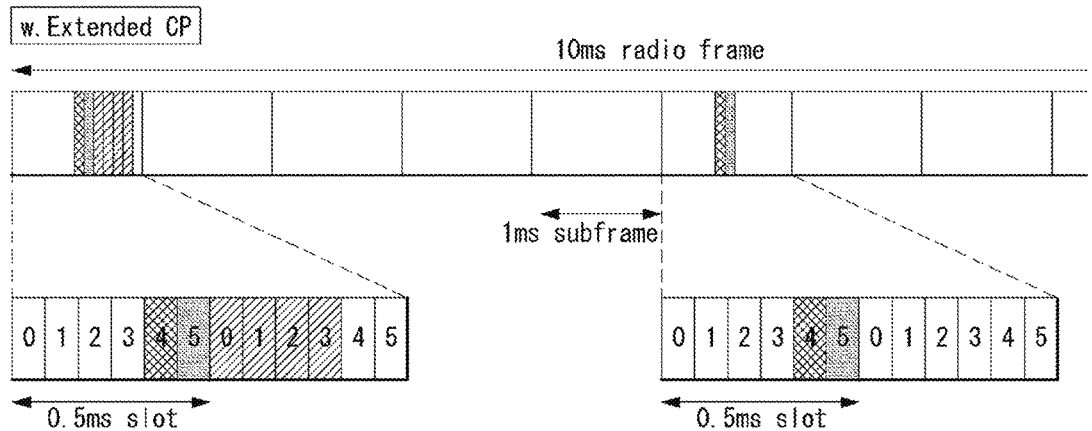
[Figure 11]
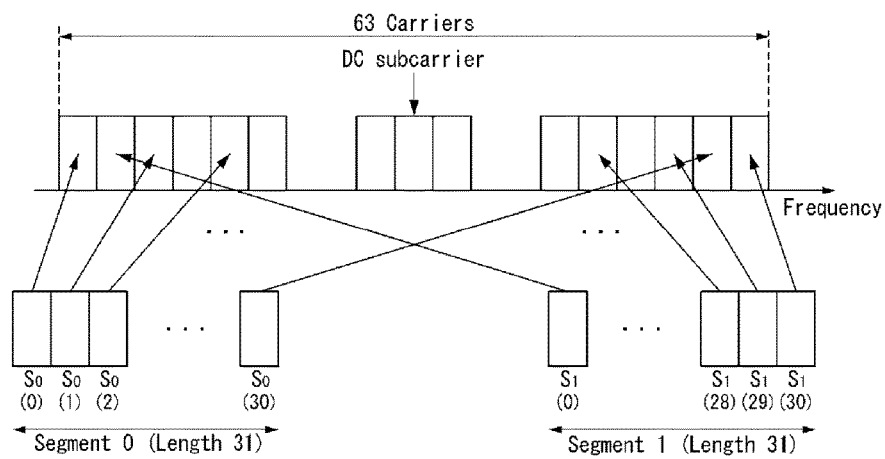

[Figure 12]
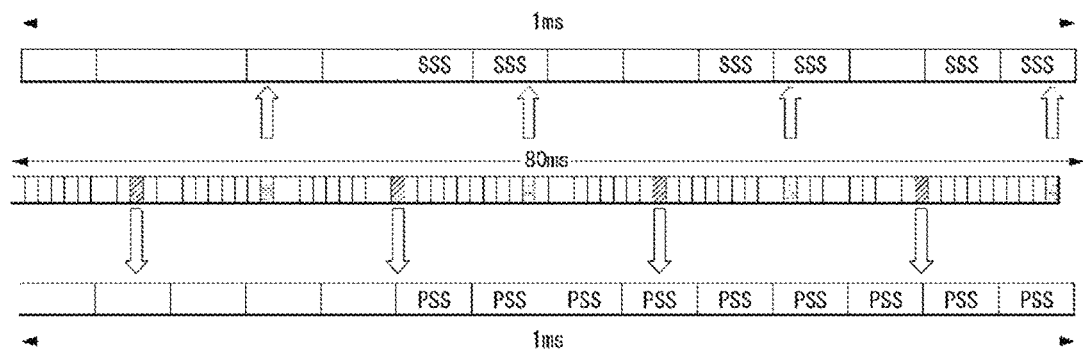
[Figure 13]
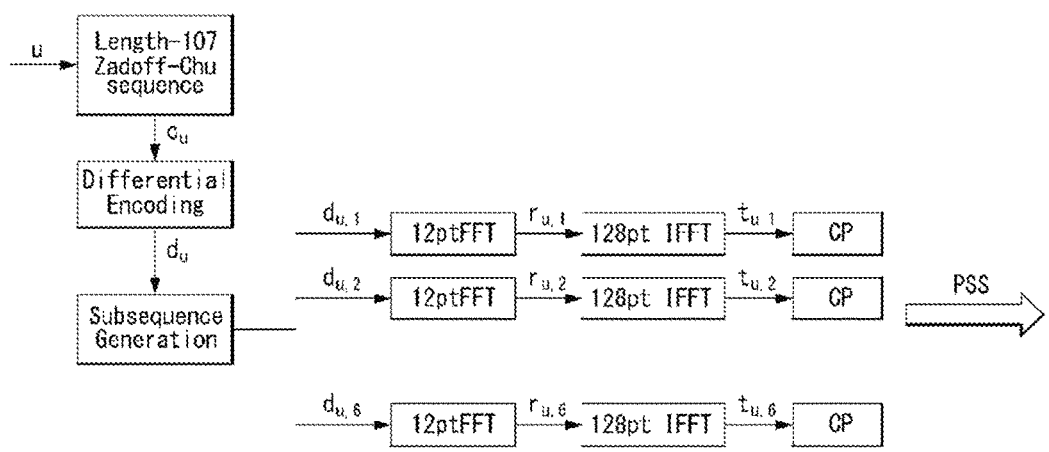

【Figure 14】
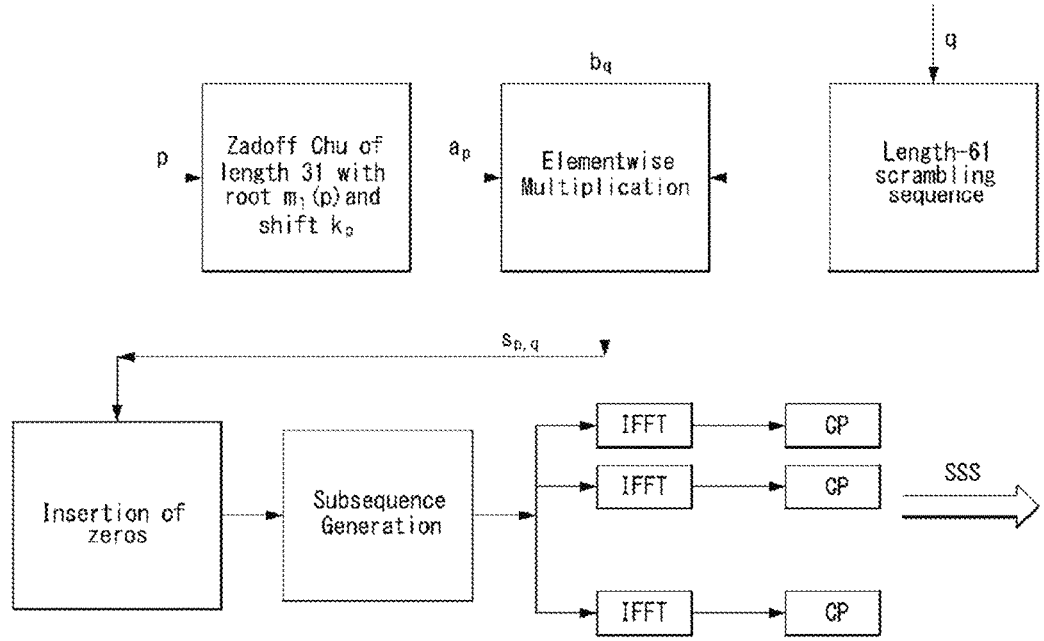
【Figure 15】
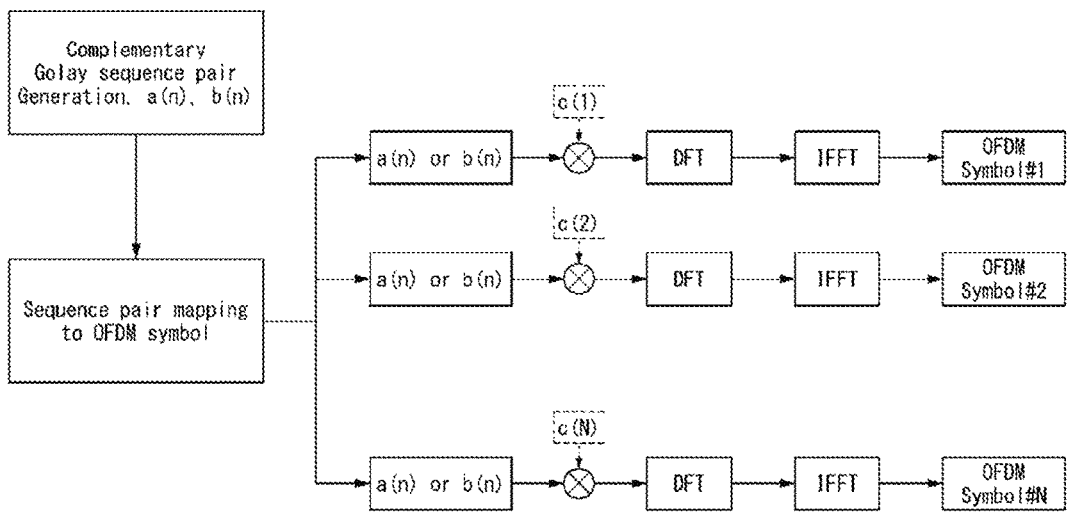

[Figure 16]
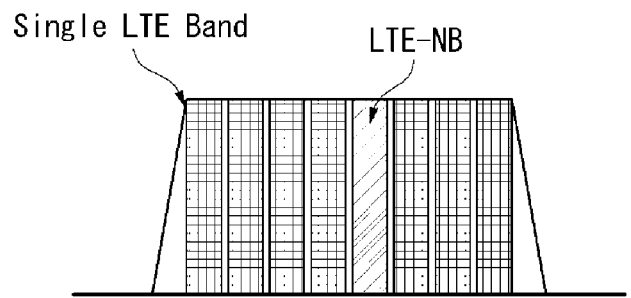
(a) In-band system
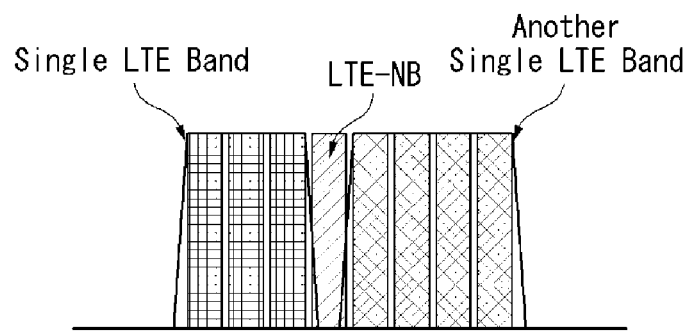
(b) Guard-band system
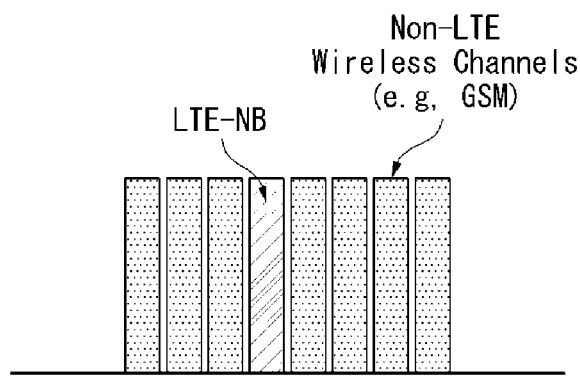
(c) Stand-alone system

[Figure 17]
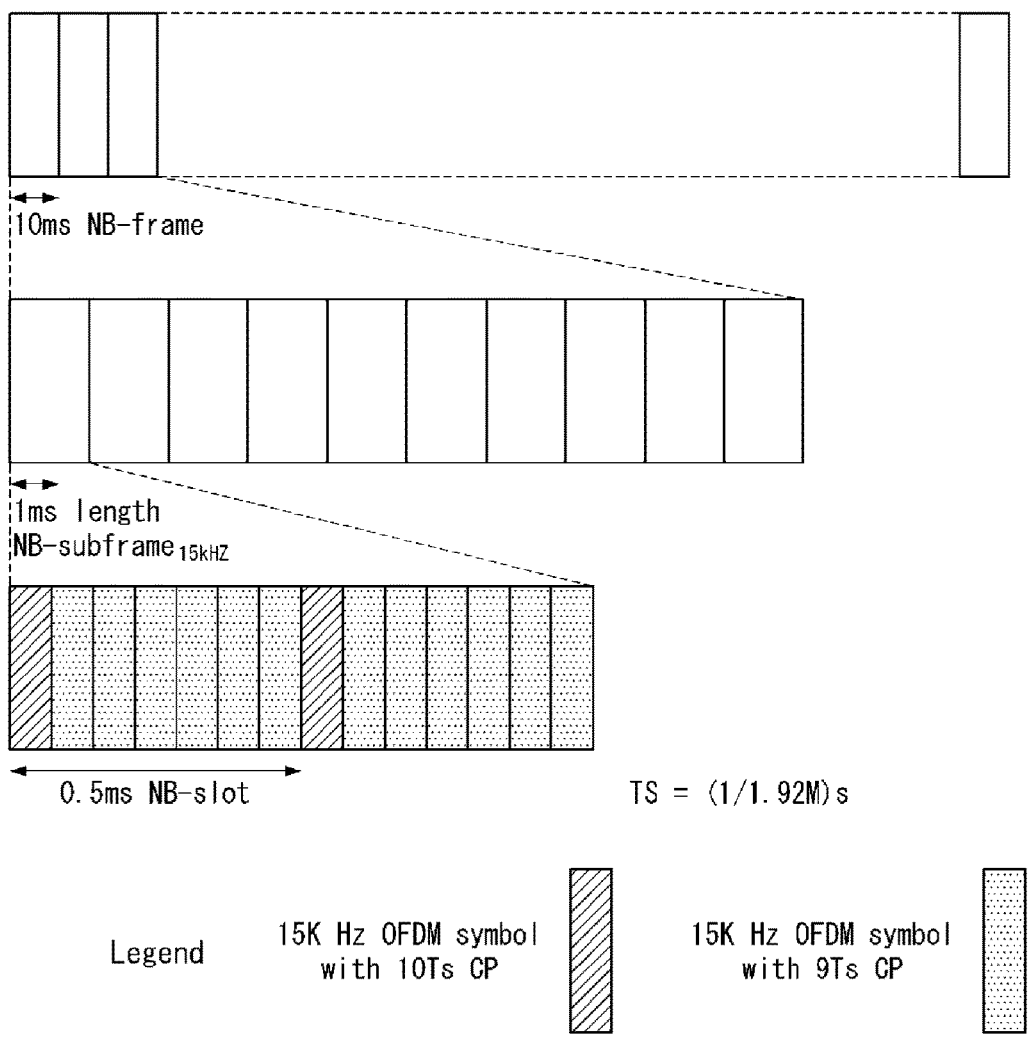

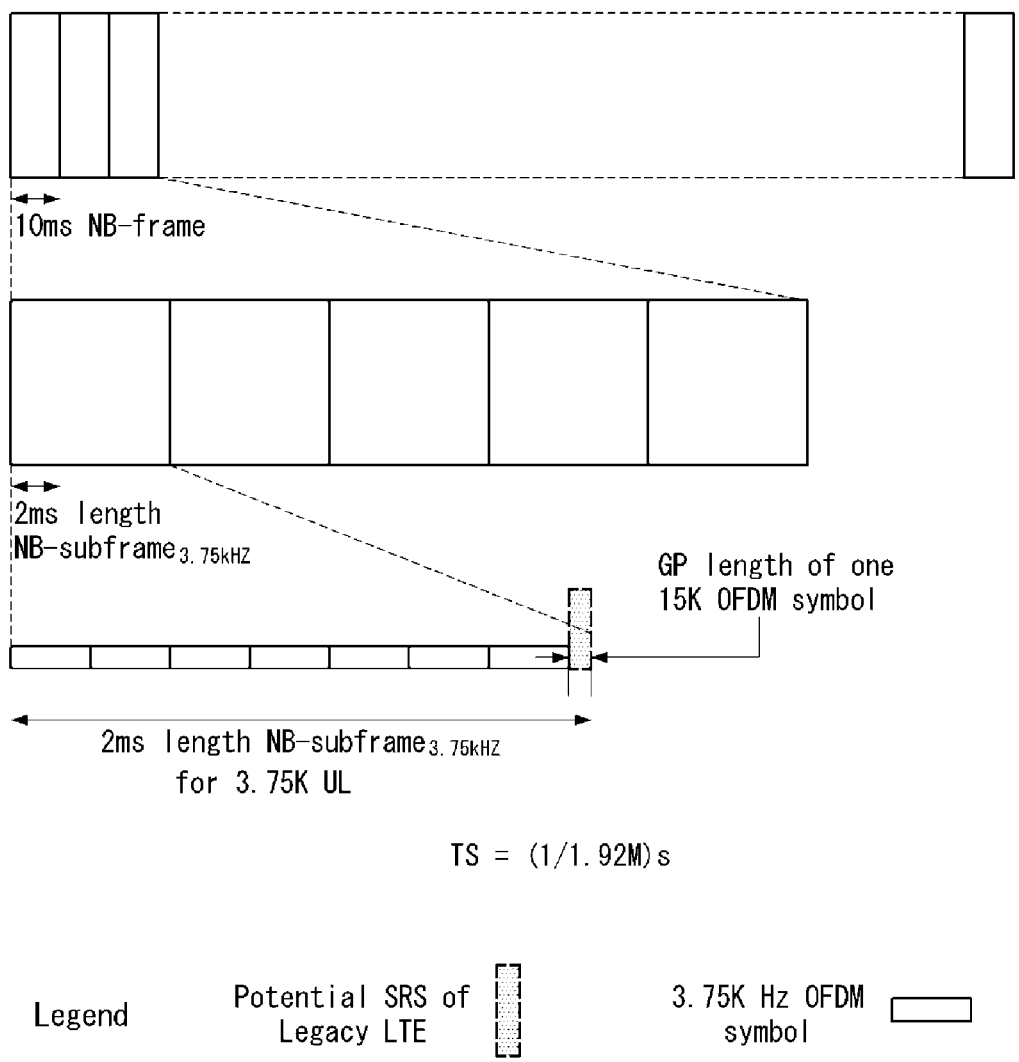
[Figure 18]

[Figure 19]
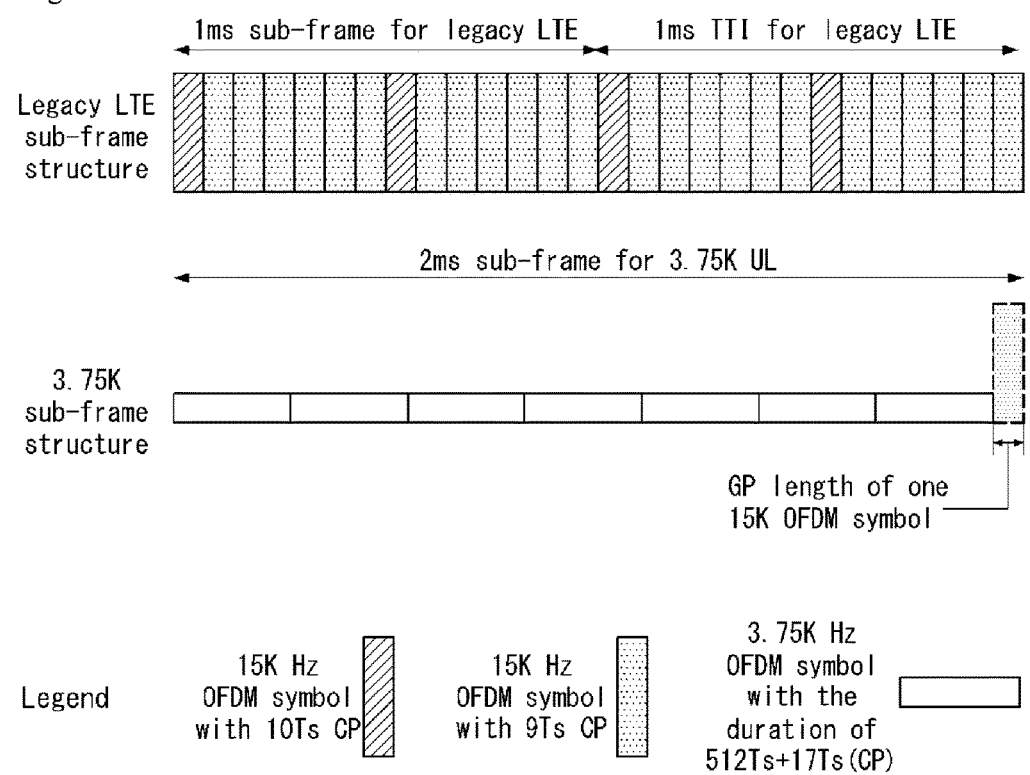

[Figure 20]
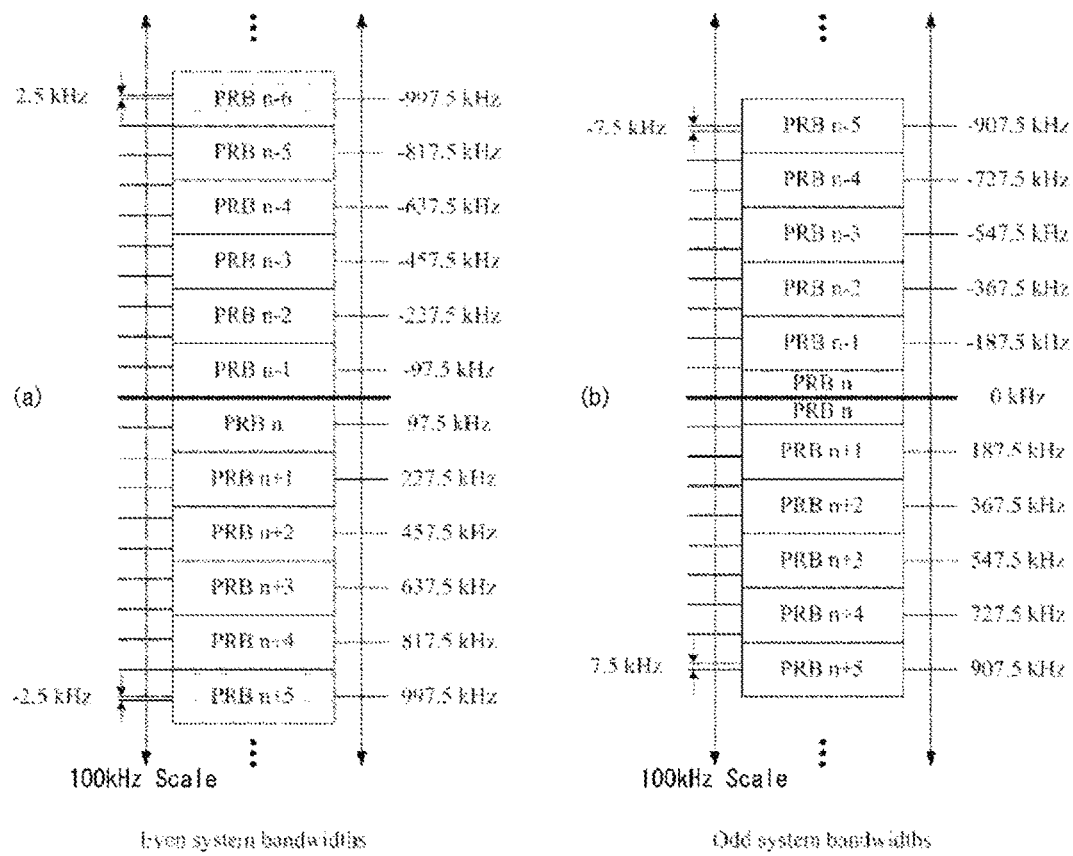

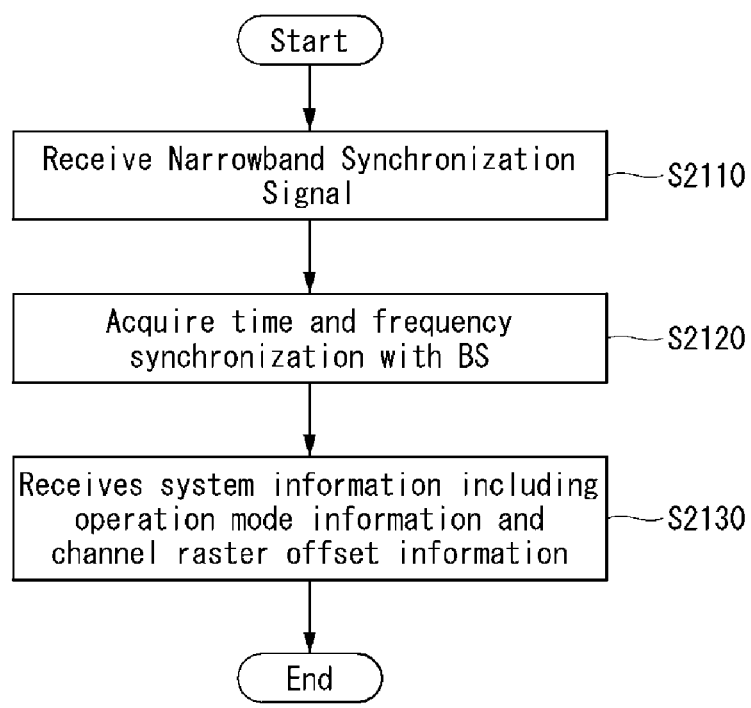
[Figure 21]

[Figure 22]

| 10 MHz (n=25) | 20 MHz (n=50) | | |
|---|---|---|---|
| 2210 | 4 | PRB n-46 | -8197.5 kHz |
| | 9 | PRB n-41 | -7297.5 kHz |
| | 14 | PRB n-36 | -6397.5 kHz |
| | 19 | PRB n-31 | -5497.5 kHz |
| | 24 | PRB n-26 | -4597.5 kHz |
| 4 | 29 | PRB n-21 | -3697.5 kHz |
| 9 | 34 | PRB n-16 | -2797.5 kHz |
| 14 | 39 | PRB n-11 | -1897.5 kHz |
| 19 | 44 | PRB n-6 | -997.5 kHz |
| ⋮ | ⋮ | ⋮ | |
| 24 | 49 | PRB n-1 | -97.5 kHz |
| 25 | 50 | PRB n | 97.5 kHz |
| ⋮ | ⋮ | ⋮ | |
| 30 | 55 | PRB n+5 | 997.5 kHz |
| 35 | 60 | PRB n+10 | 1897.5 kHz |
| 40 | 65 | PRB n+15 | 2797.5 kHz |
| 45 | 70 | PRB n+20 | 3697.5 kHz |
| | 75 | PRB n+25 | 4597.5 kHz |
| | 80 | PRB n+30 | 5497.5 kHz |
| | 85 | PRB n+35 | 6397.5 kHz |
| | 90 | PRB n+40 | 7297.5 kHz |
| | 95 | PRB n+45 | 8197.5 kHz |

Raster offset 2.5kHz (upper section)

Raster offset -2.5kHz (lower section)

[Figure 23]
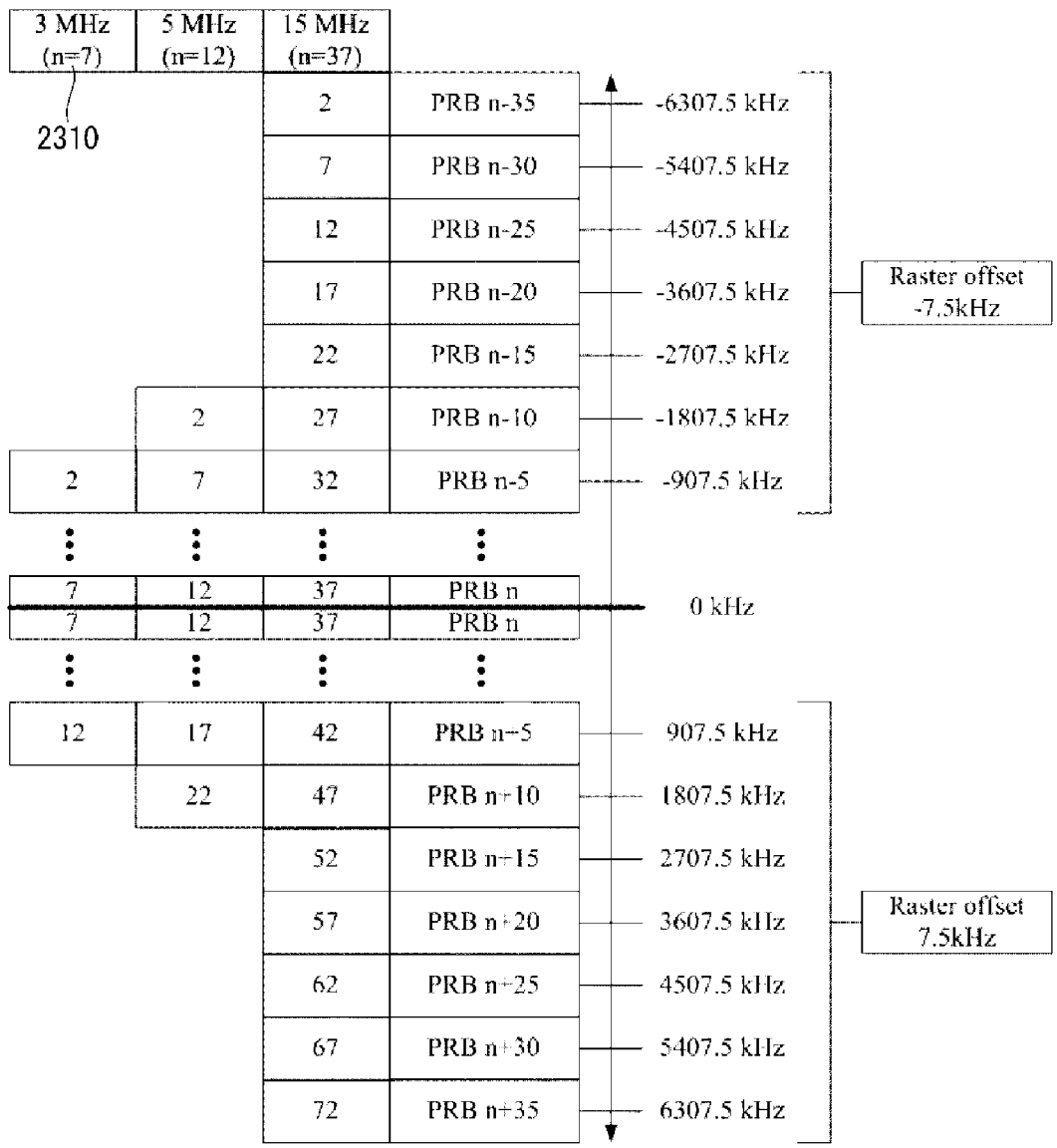

[Figure 24]
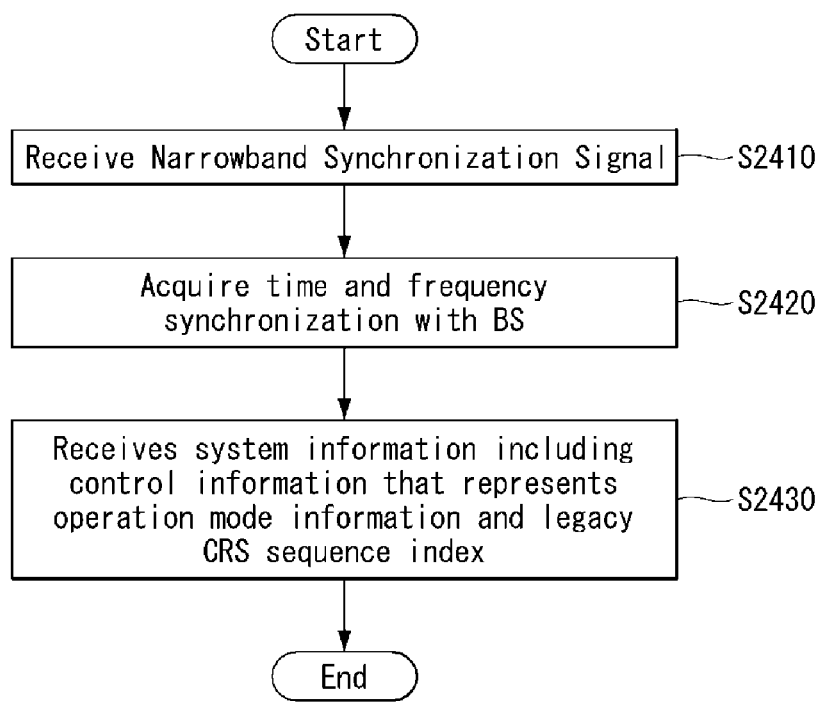

[Figure 25]
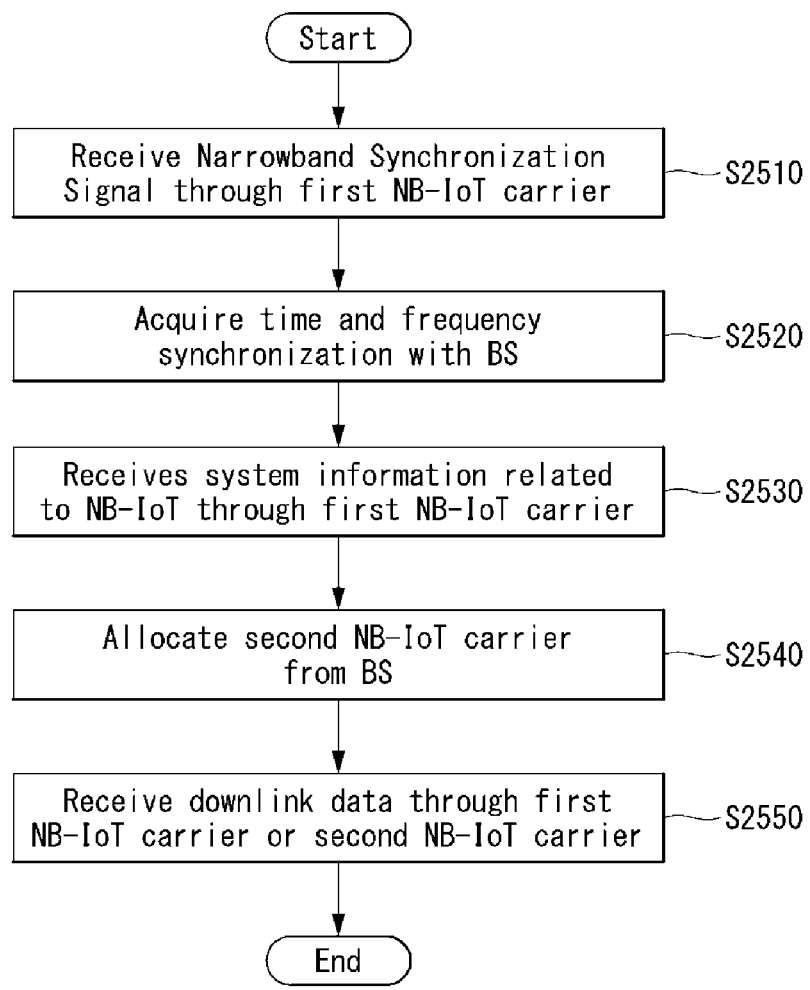

[Figure 26]
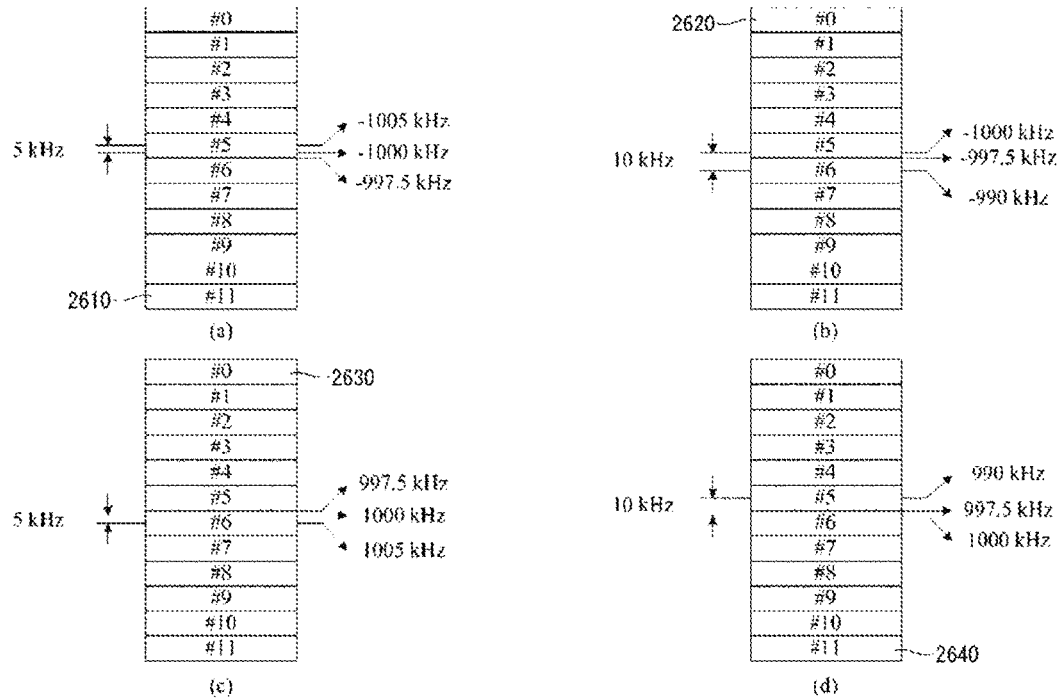
[Figure 27]
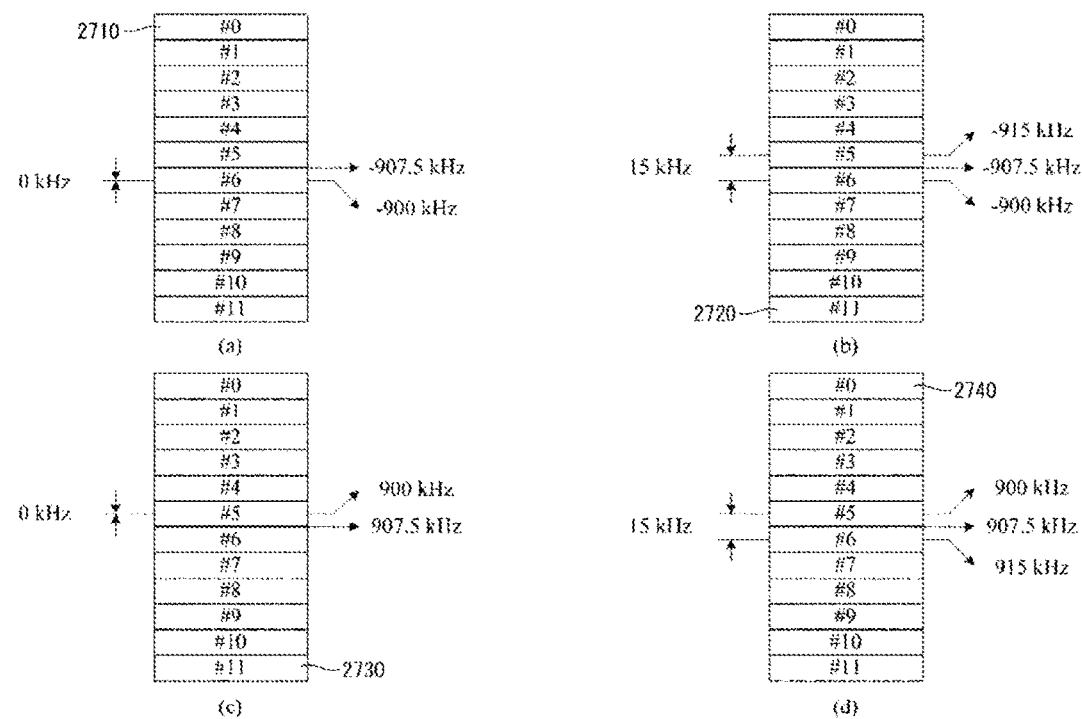

【Figure 28】
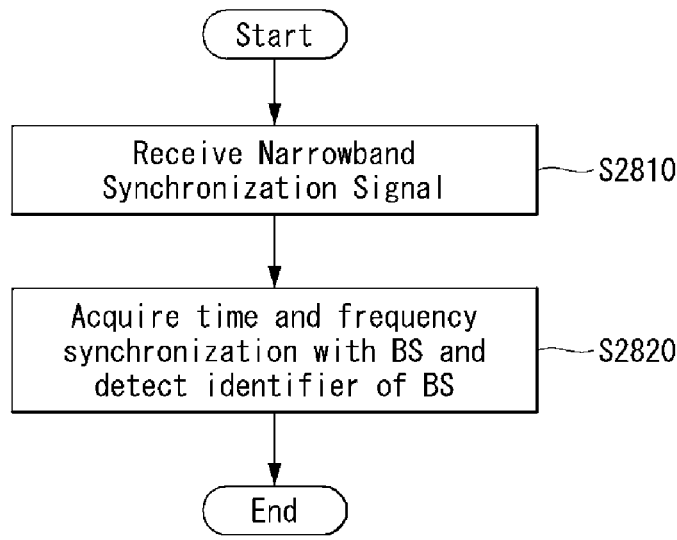
【Figure 29】
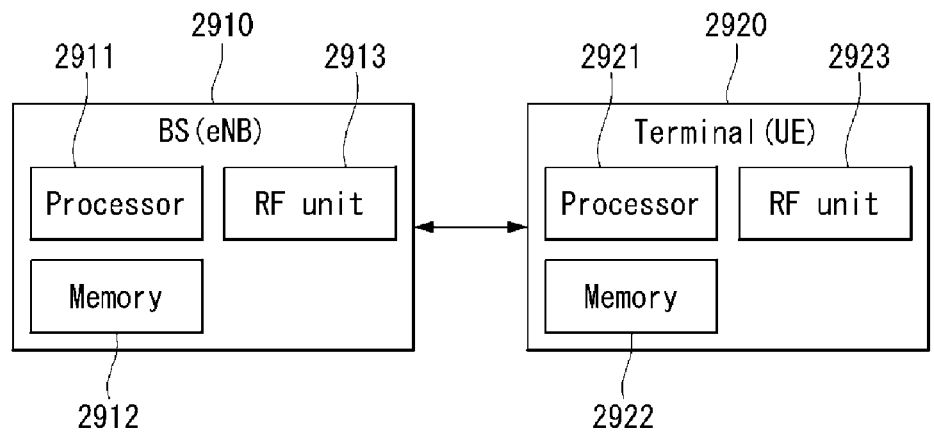

METHOD FOR RECEIVING SYSTEM INFORMATION IN WIRELESS COMMUNICATION SYSTEM THAT SUPPORTS NARROWBAND IOT AND APPARATUS FOR THE SAME

CROSS-REFERENCE TO RELATED APPLICATIONS

Pursuant to 35 U.S.C. § 119(e), this application claims the benefit of U.S. Provisional Application Nos. 62/300,076, filed on Feb. 26, 2016, 62/304,315, filed on Mar. 6, 2016, 62/354,827, filed on Jun. 27, 2016 and 62/356,508, filed on Jun. 29, 2016, the contents of which are all hereby incorporated by reference herein in their entirety.

BACKGROUND OF THE INVENTION

Field of the Invention

The present invention relates to wireless communication systems that support the narrow band IoT, and more particularly, to a method for receiving system information in a wireless communication system that supports the narrow band IoT and an apparatus for the same.

Discussion of the Related Art

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

SUMMARY OF THE INVENTION

An object of the present disclosure is to define additional information or assistant information for using the legacy LTE CRS in the NB-IoT system, and to provide a method for transmitting and receiving the same.

In addition, an object of the present disclosure is to provide a method for transmitting and receiving downlink data using multiple NB-IoT carriers in the NB-IoT system.

In addition, an object of the present disclosure is to provide a method for transmitting and receiving N-PSS using eleven subcarriers.

Technical objects of the present invention are not limited to those objects described above; other technical objects not mentioned above can be clearly understood from what are described below by those skilled in the art to which the present invention belongs.

According to an aspect of the present disclosure, a method for receiving system information performed by a terminal in a wireless communication system that supports Narrow Band (NB)-Internet of Things (IoT) includes receiving a Narrowband Synchronization Signal from a base station through narrowband (NB); acquiring time synchronization and frequency synchronization with the base station based on the Narrowband Synchronization Signal; and receiving the system information related to the NB-IoT from the base station through a Narrowband Physical Broadcast Channel (N-PBCH), where the system information includes at least one of operation mode information that represents an operation mode of an NB-IoT system or channel raster offset information that represents a channel raster offset.

In addition, in the present disclosure, the operation mode is an in-band mode, a guard-band mode or a stand-alone mode.

In addition, in the present disclosure, the in-band mode includes a first in-band mode in which the NB-IoT system and LTE system have a same Physical Cell ID (PCI) and a second in-band mode in which the NB-IoT system and LTE system have different Physical Cell IDs (PCIs).

In addition, in the present disclosure, the channel raster offset is +2.5 kHz, +7.5 kHz, −2.5 kHz or −7.5 kHz.

In addition, in the present disclosure, the system information is a Master Information Block (MIB).

In addition, in the present disclosure, the narrowband is a system bandwidth that corresponds to 1 Physical Resource Block (PRB) of Long Term Evolution (LTE) system.

In addition, in the present disclosure, the 1 PRB includes 12 subcarriers.

In addition, in the present disclosure, the narrowband synchronization signal includes a narrowband primary synchronization signal and a narrowband secondary synchronization signal.

In addition, in the present disclosure, the narrowband synchronization signal is generated using a Zadoff-Chu (ZC) sequence.

In addition, in the present disclosure, the narrowband primary synchronization signal is received through 11 contiguous subcarriers among the 12 subcarriers.

According to another aspect of the present invention, a terminal for receiving system information in a wireless communication system that supports Narrow Band (NB)-Internet of Things (IoT) includes a Radio Frequency (RF) unit for transmitting and receiving a radio signal; and a processor for controlling the RF unit, where the processor is configured to perform receiving a Narrowband Synchronization Signal from a base station through narrowband (NB); acquiring time synchronization and frequency synchronization with the base station based on the Narrowband Synchronization Signal; and receiving the system information related to the NB-IoT from the base station through a Narrowband Physical Broadcast Channel (N-PBCH), where the system information includes at least one of operation mode information that represents an operation mode of an NB-IoT system or channel raster offset information that represents a channel raster offset.

BRIEF DESCRIPTION OF THE DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 illustrates the configuration of a known MIMO communication system.

FIG. 6 is a diagram showing a channel from a plurality of transmission antennas to a single reception antenna.

FIG. 7 illustrates an example of component carriers and a carrier aggregation in a wireless communication system to which an embodiment of the present invention may be applied.

FIG. 8 is a diagram illustrating a cell classification in a system that supports the carrier aggregation.

FIG. 9 is a diagram illustrating a frame structure used for an SS transmission in a system that uses a normal cyclic prefix (CP).

FIG. 10 is a diagram illustrating a frame structure used for an SS transmission in a system that uses an extended CP.

FIG. 11 is a diagram illustrating two sequences in a logical region being mapped to a physical region by being interleaved.

FIG. 12 is a diagram illustrating a frame structure to which M-PSS and M-SSS are mapped.

FIG. 13 is a diagram illustrating a method for generating M-PSS according to an embodiment of the present invention.

FIG. 14 is a diagram illustrating a method for generating M-SSS according to an embodiment of the present invention.

FIG. 15 illustrates an example of a method for implementing M-PSS to which the method proposed in the present disclosure can be applied.

FIG. 16 illustrates an example of an operation system of the NB LTE system to which the method proposed in the present disclosure can be applied.

FIG. 17 illustrates an example of an NB-frame structure with respect to 15 kHz subcarrier spacing to which the method proposed in the present disclosure can be applied.

FIG. 18 illustrates an example of an NB-frame structure with respect to 3.75 kHz subcarrier spacing to which the method proposed in the present disclosure can be applied.

FIG. 19 illustrates an example of an NB subframe structure in 3.75 kHz subcarrier spacing to which the method proposed in the present disclosure can be applied.

FIG. 20 is a diagram illustrating an example of a channel raster offset for different system bandwidths proposed in the present disclosure.

FIG. 21 is a flowchart illustrating an example of a method for transmitting and receiving system information in the NB-IoT system proposed in the present disclosure.

FIG. 22 illustrates an example of the indices of the PRB that shares the same legacy CRS sequence index among the even system bandwidth.

FIG. 23 illustrates another example of the indices of the PRB that shares the same legacy CRS sequence index among the odd system bandwidth.

FIG. 24 is a flowchart illustrating another example of a method for transmitting and receiving system information in the NB-IoT system proposed in the present disclosure.

FIG. 25 is a flowchart illustrating an example of a method for transmitting and receiving downlink data through multiple NB-IoT carriers in the NB-IoT system proposed in the present disclosure.

FIG. 26 illustrates an example of a subcarrier selection method for transmitting the N-PSS in the even system bandwidth proposed in the present disclosure.

FIG. 27 illustrates an example of a subcarrier selection method for transmitting the N-PSS in the odd system bandwidth proposed in the present disclosure.

FIG. 28 is a flowchart illustrating an example of a method for transmitting and receiving a narrowband synchronization signal in the NB-IoT system proposed in the present disclosure.

FIG. 29 illustrates a block diagram of a wireless communication apparatus according to an embodiment of the present invention.

DETAILED DESCRIPTION OF THE INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe in a radio frame, 'D' represents a subframe for a downlink transmission, 'U' represent a subframe for an uplink transmission, 'S' represents a special subframe that includes three types, a Downlink Pilot Time Slot (DwPTS), a Guard Period (GP) and an Uplink Pilot Time Slot (UpPTS).

The DwPTS is used for an initial cell search, synchronization or channel estimation in a terminal. The UpPTS is used for the channel estimation in a BS and synchronizing an uplink transmission synchronization of a terminal. The GP is a period for removing interference occurred in uplink owing to multi-path latency of a downlink signal between uplink and downlink.

Each subframe i includes slot 2i and slot 2i+1 of $T\_slot=15360*T\_s=0.5$ ms length.

There are seven types of uplink-downlink configurations and the position and/or number of downlink subframe, special subframe and uplink subframe are different for each configuration.

The time switched from downlink to uplink or the time switched from uplink to downlink is referred to as a switching point. The periodicity of the switching point means a period in which the phenomenon of unlink subframe and downlink subframe being switched is repeated in the same pattern, and both 5 ms and 10 ms are supported. In the case of a period of 5 ms downlink-uplink switching point, the special subframe(s) is existed in every half-frame, and in the case of a period of 10 ms downlink-uplink switching point, the special subframe(s) is existed in the first half-frame only.

For all configurations, 0th, fifth subframes and the DwPTS are durations only for a downlink transmission. The subframe directly following the UpPTS and subframe are durations for an uplink transmission always.

Such an uplink-downlink configuration is the system information, and may be known to a BS and a terminal. A BS may notify the change of the uplink-downlink allocation state of a radio frame by transmitting an index of configuration information only whenever the uplink-downlink configuration information is changed. In addition, the configuration information is a sort of downlink control information and may be transmitted through a Physical Downlink Control Channel (PDCCH) like other scheduling information, or it is the broadcast information and may be commonly transmitted to all terminals in a cell through a broadcast channel.

Table 2 represents a configuration (lengths of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The radio frame structure according to an example of FIG. 1 is just an example, but the number of subcarriers included in a radio frame, the number of slots included in a subframe or the number of OFDM symbols included in a slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R)$$ [Equation 1]

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T$$ [Equation 2]

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1,y_2,\ldots,y_{N_T}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1,n_2,\ldots,n_{N_T}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \le \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

FIG. 8 is a diagram illustrating a cell classification in a system that supports the carrier aggregation.

Referring to FIG. 8, a configured cell is a cell that should be carrier-merged based on a measurement report among the cells of a BS as shown in FIG. 7, may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a Channel State Information (CSI) report for the PDSCH/PUSCH transmission and a Sounding Reference Signal (SRS) transmission. A de-activated cell is a cell that does not transmit the PDSCH/PUSCH transmission by a command of BS or a timer operation, may also stop the CSI report and the SRS transmission.

Synchronization Signal/Sequence (SS)

An SS includes a primary (P)-SS and a secondary (S)-SS, and corresponds to a signal used when a cell search is performed.

FIG. 9 is a diagram illustrating a frame structure used for an SS transmission in a system that uses a normal cyclic prefix (CP). FIG. 10 is a diagram illustrating a frame structure used for an SS transmission in a system that uses an extended CP.

The SS is transmitted in 0th subframe and second slot of the fifth subframe, respectively, considering 4.6 ms which is a Global System for Mobile communications (GSM) frame length for the easiness of an inter-Radio Access Technology (RAT) measurement, and a boundary for the corresponding radio frame may be detected through the S-SS. The P-SS is transmitted in the last OFDM symbol of the corresponding slot and the S-SS is transmitted in the previous OFDM symbol of the P-SS.

The SS may transmit total 504 physical cell IDs through the combination of 3 P-SSs and 168 S-SSs. In addition, the SS and the PBCH are transmitted within 6 RBs at the center of a system bandwidth such that a terminal may detect or decode them regardless of the transmission bandwidth.

A transmission diversity scheme of the SS is to use a single antenna port only and not separately used in a standard. That is, the transmission diversity scheme of the SS uses a single antenna transmission or a transmission technique transparent to a terminal (e.g., Precoder Vector Switching (PVS), Time-Switched Transmit Diversity (TSTD) and Cyclic-Delay Diversity (CDD)).

1. P-SS Sign

Zadoff-Chu (ZC) sequence of length 63 in frequency domain may be defined and used as a sequence of the P-SS. The ZC sequence is defined by Equation 12, a sequence element, n=31 that corresponds to a DC subcarrier is punctured. In Equation 12, N_zc=63.

$$d_u(n) = e^{-j\frac{\pi u n(n+1)}{N_{ZC}}} \quad \text{[Equation 12]}$$

Among 6 RBs (=7 subcarriers) positioned at the center of frequency domain, the remaining 9 subcarriers are always transmitted in zero value, which makes it easy to design a filter for performing synchronization. In order to define total three P-SSs, the value of u=29, 29 and 34 may be used in Equation 12. In this case, since 29 and 34 have the conjugate symmetry relation, two correlations may be simultaneously performed. Here, the conjugate symmetry means Equation 13. By using the characteristics, it is possible to implement one shot correlator for u=29 and 43, and accordingly, about 33.3% of total amount of calculation may be decreased.

$$d_u(n)=(-1)^n(d_{N_{zc}-u}(n))^*, \text{ when } N_{ZC} \text{ is even number.}$$

$$d_u(n)=(d_{N_{zc}-u}(n))^*, \text{ when } N_{ZC} \text{ is odd number.} \quad \text{[Equation 13]}$$

2. S-SS Sign

The sequence used for the S-SS is combined with two interleaved m-sequences of length 31, and 168 cell group IDs are transmitted by combining two sequences. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of terminal.

FIG. 11 is a diagram illustrating two sequences in a logical region being mapped to a physical region by being interleaved.

Referring to FIG. 11, when two m-sequences used for generating the S-SS sign are defined by S1 and S2, in the case that the S-SS (S1, S2) of subframe 0 transmits the cell group ID with the combination, the S-SS (S2, S1) of subframe 5 is transmitted with being swapped, thereby distinguishing the 10 ms frame boundary. In this case, the SSS sign uses the generation polynomial x5+x2+1, and total 31 signs may be generated through the circular shift.

In order to improve the reception performance, two different P-SS-based sequences are defined and scrambled to the S-SS, and scrambled to S1 and S2 with different sequences. Later, by defining the S1-based scrambling sign, the scrambling is performed to S2. In this case, the sign of S-SS is exchanged in a unit of 5 ms, but the P-SS-based scrambling sign is not exchanged. The P-SS-based scrambling sign is defined by six circular shift versions according to the P-SS index in the m-sequence generated from the generation polynomial x5+x2+1, and the S1-based scrambling sign is defined by eight circular shift versions according to the S1 index in the m-sequence generated from the generation polynomial x5+x4+x2+x1+1.

The contents below exemplify an asynchronous standard of the LTE system.

A terminal may monitor a downlink link quality based on a cell-specific reference signal in order to detect a downlink radio link quality of PCell.

A terminal may estimate a downlink radio link quality for the purpose of monitoring the downlink radio link quality of PCell, and may compare it with Q_out and Q_in, which are thresholds.

The threshold value Q_out may be defined as a level in which a downlink radio link is not certainly received, and may correspond to a block error rate 10% of a hypothetical PDCCH transmission considering a PCFICH together with transmission parameters.

The threshold value Q_in may be defined as a downlink radio link quality level, which may be great and more certainly received than Q_out, and may correspond to a block error rate 2% of a hypothetical PDCCH transmission considering a PCFICH together with transmission parameters.

Narrow Band (NB) LTE Cell Search

In the NB-LTE, although a cell search may follow the same rule as the LTE, there may be an appropriate modification in the sequence design in order to increase the cell search capability.

FIG. 12 is a diagram illustrating a frame structure to which M-PSS and M-SSS are mapped. In the present disclosure, an M-PSS designates the P-SS in the NB-LTE, and an M-SSS designates the S-SS in the NB-LTE. The M-PSS may also be designated to 'NB-PSS' and the M-SSS may also be designated to 'NB-SSS'.

Referring to FIG. 12, in the case of the M-PSS, a single primary synchronization sequence/signal may be used. (M-)PSS may be spanned up to 9 OFDM symbol lengths, and used for determining subframe timing as well as an accurate frequency offset.

This may be interpreted that a terminal may use the M-PSS for acquiring time and frequency synchronization with a BS. In this case, (M-)PSS may be consecutively located in time domain.

The M-SSS may be spanned up to 6 OFDM symbol lengths, and used for determining the timing of a cell identifier and an M-frame. This may be interpreted that a terminal may use the M-SSS for detecting an identifier of a BS. In order to support the same number as the number of cell identifier groups of the LTE, 504 different (M-)SSS may be designed.

Referring to the design of FIG. 12, the M-PSS and the M-SSS are repeated every 20 ms average, and existed/generated four times in a block of 80 ms. In the subframes that include synchronization sequences, the M-PSS occupies the last 9 OFDM symbols. The M-SSS occupies 6th, 7th, 10th, 11th, 13th and 14th OFDM symbols in the case of normal CP, and occupies 5th, 6th, 9th, 11th and 12th OFDM symbols in the case of extended CP.

The 9 OFDM symbols occupied by the M-PSS may be selected to support for the in-band disposition between LTE carriers. This is because the first three OFDM symbols are used to carry a PDCCH in the hosting LTE system and a subframe includes minimum twelve OFDM symbols (in the case of extended CP).

In the hosting LTE system, a cell-specific reference signal (CRS) is transmitted, and the resource elements that correspond to the M-PSS may be punctured in order to avoid a collision. In the NB-LTE, a specific position of M-PSS/M-SSS may be determined to avoid a collision with many legacy LTE signals such as the PDCCH, the PCFICH, the PHICH and/or the MBSFN.

In comparison with the LTE, the synchronization sequence design in the NB-LTE may be different.

This may be performed in order to attain a compromise between decreased memory consumption and faster synchronization in a terminal. Since the M-SSS is repeated four times in 80 ms duration, a slight design modification for the M-SSS may be required in the 80 ms duration in order to solve a timing uncertainty.

Structure of M-PSS and M-SSS

In the LTE, the PSS structure allows the low complexity design of timing and frequency offset measuring instrument, and the SSS is designed to acquire frame timing and to support unique 504 cell identifiers.

In the case of In-band and Guard-band of the LTE, the disposition of CP in the NB-LTE may be selected to match the CP in a hosting system. In the case of standalone, the extended CP may be used for matching a transmitter pulse shape for exerting the minimum damage to the hosting system (e.g., GSM).

A single M-PSS may be clearly stated in the N-LTE of the LTE. In the procedure of PSS synchronization of the LTE, for each of PSSs, a specific number of frequency speculations may be used for the coarse estimation of symbol timing and frequency offset.

Such an adaption of the procedure in the NB-LTE may increase the process complexity of a receiver according to the use of a plurality of frequency assumptions. In order to solve the problem, a sequence resembling of the Zadoff-Chu sequence which is differentially decoded in time domain may be proposed for the M-PSS. Since the differential decoding is performed in a transmission process, the differential decoding may be performed during the processing time of a receiver. Consequently, a frequency offset may be transformed from the consecutive rotation for symbols to the fixed phase offset with respect to the corresponding symbols.

FIG. 13 is a diagram illustrating a method for generating M-PSS according to an embodiment of the present invention.

Referring to FIG. 13, first, when starting with a basic sequence of length 107 as a basis in order to generate an M-PSS, Equation 14 below may be obtained.

$$c(n) = e^{\frac{j\pi un(n+1)}{N}}, n = \{0, 1, 2, \ldots, 106\} \quad \text{[Equation 14]}$$

The basic sequence c(n) may be differentially decoded in order to obtain d(n) sequence as represented in Equation 15.

$$d(n+1)=d(n)c(n), n=\{0,1,2,\ldots,106\}, d(0)=1, \quad \text{[Equation 15]}$$

The d(n) sequence is divided into 9 sub sequences, and each sub sequence has a length 12 and a sampling rate of 130 kHz. The 120-point FFT is performed for each of 9 sub sequences, and each sequence may be oversampled 128/12 times up to 1.92 MHz sampling rate using 128 IFFT zero padding. Consequently, each sub sequence may be mapped to 12 subcarriers for 9 OFDM symbols, respectively.

Each of the sub sequences is mapped to a single OFDM symbol, and the M-PSS may occupy total 9 OFDM symbols since total 9 sub sequences are existed. Total length of the M-PSS may be 1234(=(128+9)*9+1) when the normal CP of 9 samples are used, and may be 1440 when the extended CP is used.

The M-PSS which is going to be actually used during the transmission is not required to be generated every time using complex procedure in a transmitter/receiver in the same manner. The complexity coefficient (i.e., t_u(n)) that corresponds to the M-PSS may be generated in offline, and directly stored in the transmitter/receiver. In addition, even in the case that the M-PSS is generated in 1.92 MHz, the occupation bandwidth may be 180 kHz.

Accordingly, in the case of performing the procedure related to time and frequency offset measurements using the M-PSS in a receiver, the sampling rate of 192 kHz may be used for all cases. This may significantly decrease the complexity of receiver in the cell search.

In comparison with the LTE, the frequency in which the M-PSS is generated in the NB-LTE causes slightly greater overhead than the PSS in the LTE. More particularly, the synchronization sequence used in the LTE occupies 2.86% of the entire transmission resources, and the synchronization sequence used in the NB-LTE occupies about 5.36% of the entire transmission resources. Such an additional overhead has an effect of decreasing memory consumption as well as the synchronization time that leads to the improved battery life and the lower device price.

The M-SSS is designed in frequency domain and occupies 12 subcarriers in each of 6 OFDM symbols. Accordingly, the number of resource elements dedicated to the M-SSS may be 72. The M-SSS includes the ZC sequence of a single length 61 which are padded by eleven '0's on the starting point.

In the case of the extended CP, the first 12 symbols of the M-SSS may be discarded, and the remaining symbols may be mapped to the valid OFDM symbols, which cause to discard only a single symbol among the sequence of length 61 since eleven '0's are existed on the starting point. The discard of the symbol causes the slight degradation of the correlation property of other SSS.

The cyclic shift of a sequence and the sequence for different roots may easily provide specific cell identifiers up to 504. The reason why the ZC sequence is used in the NB-LTE in comparison with the LTE is to decrease the error detection rate. Since a common sequence for two different cell identifier groups is existed, an additional procedure is required in the LTE.

Since the M-PSS/M-SSS occur four times within the block of 80 ms, the LTE design of the SSS cannot be used for providing accurate timing information within the corresponding block. This is because the special interleaving structure that may determine only two positions. Accordingly, a scrambling sequence may be used in an upper part of the ZC sequence in order to provide the information of frame timing. Four scrambling sequences may be required to determine four positions within the block of 80 ms, which may influence on acquiring the accurate timing.

FIG. 14 is a diagram illustrating a method for generating M-SSS according to an embodiment of the present invention.

Referring to FIG. 14, the M-SSS may be defined as s_p,q(n)=a_p(n)·b_q(n). Herein, p={0, 1, . . . , 503} represents cell identifiers and q={0, 1, 2, 3} determines the position of the M-SSS (i.e., the number of M-SSS within the block of 80 ms which is generated before the latest SSS). In addition, a_p(n) and b_q(n) may be determined by Equations 16 and 17 below.

$$a_p(n) = 0, \quad n = \{0-4, 66-71\} \quad \text{[Equation 16]}$$
$$a_p(n - k_p - 5), \quad n = \{5, 6, \ldots, 65\}$$
$$a_p(n) = e^{-\frac{j\pi m(p)n(n+1)}{61}}, \quad n = \{0, 1, \ldots, 61\}$$

$$b_q(n) = b(\mathrm{mod}(n - l_q, 63)) \quad \text{[Equation 17]}$$
$$n = \{0, 1, \ldots 60\}, q = \{0, 1, 2, 3\},$$
$$l_0 = 0, l_1 = 3, l_2 = 7, l_3 = 11$$
$$b(n + 6) = \mathrm{mod}(b(n) + b(n + 1), 2),$$
$$n = \{0, 1, \ldots 55\},$$
$$b(0) = 1, b(m) = 0, \quad m = \{1, 2, 3, 4, 5\}$$

Referring to Equation 16, a_p(n) is the ZC sequence and determines a cell identifier group. m(p) and cyclic shift k_p may be used for providing a specific cell identifier. Referring to Equation 17, b_q(n) may be the scrambling sequence that includes a cyclic shift of the basic sequence b_(n), and may be used for indicating the position of the M-SSS in the M-frame in order to acquire the frame timing. The cyclic shift l_q may be determined according to the value q.

The value of m(p) with respect to the specific p may be determined such as m(p)=1+mod(p, 61), the value of k_p may be determined such as k_p=7[p/61].

FIG. 15 illustrates an example of a method for implementing M-PSS to which the method proposed in the present disclosure can be applied.

Particularly, FIG. 15 shows a method for generating an M-PSS using a complementary Golay sequence.

As shown in FIG. 15, using a complementary Golay sequence pair, a CGS that is going to be transmitted to each OFDM symbol is selected (i.e., select a(n) or b(n)).

Next, in the case of using a cover code, c(1) to c(N) may be multiplied to each CGS, and in the case of not using the cover code, 1 may be inputted to all of c(n).

Subsequently, the DFT and the IFFT are performed for each symbol, and transmitted to each OFDM symbol on time domain.

Additionally, the ZC sequence of length 12 may also generate a sequence that is going to be transmitted to each OFDM symbol.

In this case, by using the same method applied in FIG. 15, the M-PSS may be implemented.

Operation System of the NB LTE System

FIG. 16 illustrates an example of an operation system of the NB LTE system to which the method proposed in the present disclosure can be applied.

Particularly, FIG. 16(a) shows an In-band system, FIG. 16(b) shows a Guard-band system, and FIG. 16(c) shows a Stand-alone system.

The In-band system may be expressed by an In-band mode, the Guard-band system may be expressed by a Guard-band mode, and the Stand-alone system may be expressed by a Stand-alone mode.

The In-band system shown in FIG. 16(a) is referred to as a system or a mode in which a specific 1 RB in the legacy LTE band is used for the NB-LTE (or LTE-NB), and may be operated by allocating a part of the resource blocks of the LTE system carrier.

The legacy LTE band has the guardband of minimum 100 kHz in the last part of each LTE band.

In order to use 200 kHz, two non-contiguous guardband may be used.

The In-band system and the Guard-band system represent the structure in which the NB-LTE is coexisted in the legacy LTE band.

On the contrary, the Stand-alone system shown in FIG. 16(c) is referred to as a system or a mode which is independently constructed from the legacy LTE band, and may be operated by separately allocating the frequency band (the GSM reallocated carrier later) used in GERAN.

FIG. 17 illustrates an example of an NB-frame structure with respect to 15 kHz subcarrier spacing to which the method proposed in the present disclosure can be applied.

As shown in FIG. 17, it is shown that the NB-frame structure for the subcarrier spacing of 15 kHz is the same as the frame structure of the legacy system (LTE system).

That is, the NB-frame of 10 ms includes ten NB-subframes of 1 ms, and the NB-subframe of 1 ms includes two NB-slot of 0.5 ms.

FIG. 18 illustrates an example of an NB-frame structure with respect to 3.75 kHz subcarrier spacing to which the method proposed in the present disclosure can be applied.

Referring to FIG. 18, the NB-frame of 10 ms includes five NB-subframes of 2 ms, and the NB-subframe of 2 ms includes seven OFDM symbols and a guard period (GP).

The NB-subframe of 2 ms may also be expressed by an NB-slot, an NB-resource unit (RU), or the like.

FIG. 19 illustrates an example of an NB subframe structure in 3.75 kHz subcarrier spacing to which the method proposed in the present disclosure can be applied.

FIG. 19 shows the correspondence relation between the legacy LTE subframe structure and the subframe structure of 3.75 kHz.

Referring to FIG. 19, it is shown that the subframe (2 ms) of 3.75 kHz corresponds to two subframes of 1 ms (or TTI of 1 ms) of the legacy LTE.

Hereinafter, in the NB-IoT (or NB-LTE) system that supports the cellular Internet of Things (IoT) proposed in the present disclosure, the assistant information for using a legacy LTE Cell-specific Reference Signal (or Common Reference Signal; CRS) will be described in detail.

As described above, the Narrowband (NB)-LTE is referred to as a system for supporting low complexity and low power consumption that has the system bandwidth corresponding one Physical Resource Block (PRB) of the LTE system.

That is, the NB-LTE system may mainly be used in a communication scheme for implementing the IoT by supporting a device (or terminal) such as machine-type communication (MTC) in a cellular system.

In addition, the NB-LTE system is not required to be allocated with additional band by using the OFDM parameters same as the LTE system such as the subframe spacing used in the conventional LTE system.

That is, the NB-LTE system has an advantage in that the frequency may be efficiently used by allocating 1 PRB of the legacy LTE system band for the NB-LTE use.

The physical channel in the NB-LTE system will be expressed or called by adding prefix N- (or Narrowband-) in order to distinguish it from the physical channel in the LTE system.

That is, the physical downlink channel in the NB-LTE system may be defined as N-PSS/N-SSS, N-PBCH, N-PDCCH/N-EPDCCH, N-PDSCH and the like.

In the NB-IoT system, three operation modes including the in-band mode, the guard band mode and the stand-alone mode are defined.

As described above, the in-band mode is referred to as a mode that provides the NB-IoT service using the resource block in the LTE frequency band.

The guard-band mode is referred to as a mode that provides the NB-IoT service using the resource block which is not used in the guard-band defined in the LTE frequency band.

The stand-alone mode is referred to as a mode that independently provides the NB-IoT service using the GSM frequency band for the purpose of the GSM service and the potential frequency band for the IoT service.

In this case, in order to use the legacy CRS used in the conventional LTE system in the in-band mode, a BS or a network should transmit additional information or assistant information to NB-IoT terminals.

Accordingly, the present disclosure proposes an efficient method for transmitting and receiving the additional information for using the legacy CRS in the NB-IoT system.

Master Information Block (MIB) in the NB-LTE System

First, the basic information(s) included in the Master Information Block (MIB) in the NB-IoT or NB-LTE system will be described.

The Master Information Block (MIB) transmitted through a Narrowband Physical Broadcast Channel (N-PBCH) in the NB-LTE system includes the information (1) to (6) below.

(1) The 4 most significant bits of NB-IoT SFN
(2) The NB-SIB1 scheduling information
(3) The number of legacy CRS ports
(4) Frame structure indicator
(5) Deployment(operation) mode indicator
(6) Channel raster offset indicator Among the information (1) to (6), the information (5) and (6) will be described in more detail.

Operation Mode Indicator

First, with respect to the information (5), three modes including the in-band mode, the guard band mode and the stand-alone mode are existed in the operation mode of the NB-IoT system.

However, since same-PCI indicator may be divided into two types depending on 'true' or 'false' of the indicator, it may be configured that there are total four operation modes.

Herein, the same-PCI indicator may be an indicator that represents whether an NB-IoT carrier uses the same Physical Cell ID (PCI) as the E-UTRA carrier.

Here, 'true' value may be expressed by '1' and 'false' value may be expressed by '0', otherwise, 'true' value may be expressed by '0' and 'false' value may be expressed by '1'.

Accordingly, the operation mode may be expressed in the length of 2 bits. Table 3 below represents an example of an operation mode indicator of the NB-LTE system.

TABLE 3

| Index | Operation mode (indicator) |
|---|---|
| 0 | In-band mode when the same PCI indicator is true |
| 1 | In-band mode when the same PCI indicator is false |
| 2 | Guard band mode |
| 3 | Stand-alone mode |

Referring to Table 3, when an operation mode index is '0', which represents an in-band mode of the same Physical Cell ID (PCI), and when an operation mode index is '1', which represents an in-band mode which is not the same Physical Cell ID (PCI).

Herein, the operation mode (indicator) index values (1 to 4) may correspond to '00', '01', '10' and '11', respectively.

Channel Raster Offset

Next, the information (6), that is, the channel raster offset will be described in more detail.

The channel raster offset represents the minimum unit that a terminal read a resource. In the case of the LTE system, the channel raster offset has the value of 100 kHz.

A terminal sequentially monitors the frequency value as much as the available minimum frequency bandwidth (6 RBs, 1.08 MHz) in an interval of a channel raster (e.g., 100 kHz).

The channel raster offset has four values including ±2.5 kHz (+2.5 kHz, −2.5 kHz) and ±7.5 kHz (+7.5 kHz, −7.5 kHz) as shown in FIG. 20.

These values may represent the value that is subtracted by a multiple of integer of 100 kHz on the basis of 100 kHz from the center frequency of PRB.

Accordingly, the channel raster offset may be expressed by the length of 2 bits, and the example therefor is as Table 4 below.

FIG. 20 is a diagram illustrating an example of a channel raster offset for different system bandwidths proposed in the present disclosure.

Particularly, FIG. 20A represents the channel raster offset of ±2.5 kHz with respect to an even system bandwidth, and FIG. 20B represents the channel raster offset of ±7.5 kHz with respect to an odd system bandwidth.

In FIG. 20A and FIG. 20B, the left scale represents the channel raster scale of 100 kHz, and the right scale represents the scale that corresponds to the center frequency of each PRB.

TABLE 4

| Index | Channel raster offset (kHz) |
|---|---|
| 0 | 2.5 |
| 1 | −7.5 |
| 2 | 7.5 |
| 3 | −2.5 |

That is, in the NB-LTE system, in order to use the legacy CRS information, a BS transmits an MIB that includes an operation mode indicator and the channel raster offset information to a terminal.

FIG. 21 is a flowchart illustrating an example of a method for transmitting and receiving system information in the NB-IoT system proposed in the present disclosure.

First, a terminal receives a Narrowband Synchronization Signal from a BS through a narrowband (NB) (step, S2110).

The narrowband represents the system bandwidth that corresponds to 1 Physical Resource Block (PRB) of the Long Term Evolution (LTE) system, and includes 12 subcarriers.

In addition, the Narrowband Synchronization Signal includes a narrowband primary synchronization signal (N-PSS) and a narrowband secondary synchronization signal (N-SSS).

Furthermore, the narrowband synchronization signal may be generated by using the Zadoff-Chu (ZC) sequence.

The narrowband primary synchronization signal is received from the BS through contiguous 11 subcarriers among the 12 subcarriers.

Later, the terminal acquires the time synchronization and the frequency synchronization with the BS based on the narrowband synchronization signal (step, S2120).

Additionally, the terminal may detect or determine an identifier of the BS.

Later, the terminal receives the system information related to the NB-IoT through a Narrowband Physical Broadcast Channel (N-PBCH) from the BS (step, S2130).

The system information may include at least one of the operation mode information that represents an operation mode of the NB-IoT system or the channel raster offset information that represents a channel raster offset value.

The system information may be the Master Information Block (MIB).

The operation mode represents an In-band mode operated in the in-band, the guard-band mode operated in the guard-band and the stand-alone mode operated in stand-alone.

Herein, the in-band mode may include a first in-band mode in which the NB-IoT system and the LTE system use the same Physical Cell ID (PCI) and a second in-band mode in which the NB-IoT system and the LTE system use different Physical Cell IDs (PCIs).

The channel raster offset value may have +2.5 kHz, +7.5 kHz, −2.5 kHz or −7.5 kHz.

Assistant Information of Legacy CRS in MIB

The reason why the in-band mode is divided according to the same PCT indicator in Table 3 above is relate to the problem on whether the legacy CRS is available to be used in the NB-IoT system.

That is, it may be configured that the legacy CRS is used when the same PCI indicator is 'true', but it may not be configured that the legacy CRS is used when the same PCI indicator is 'false'.

In addition, when the same PCI indicator is 'true', the NB-IoT terminal should know the sequence used in the legacy CRS transmitted to the corresponding PRB in order to use the legacy CRS and the corresponding legacy CRS sequence index.

That is, the NB-IoT terminal requires a slot number, an OFDM symbol number, a Cyclic Prefix (CP) shape, a cell ID, a system bandwidth, and so on, and also should know the index of the corresponding PRB.

In this case, although a slot number, an OFDM symbol number, a Cyclic Prefix (CP) shape, a cell ID, and so on are the same for the NB-IoT system and the legacy LTE system, in the aspect of an NB-IoT terminal, it is required to know the legacy system bandwidth and the PRB index additionally.

That is, the NB-IoT terminal may know accurate legacy CRS sequence and the corresponding legacy CRS sequence index using the legacy system bandwidth and the PRB index information.

Assuming that the NB-LTE system is operated in the in-band mode, as the PRB in which an N-PSS and an N-SSS may be transmitted, the PRBs that make an additional Carrier Frequency Offset (CFO) value be within ±7.5 kHz should be selected.

The PRB indices that make an additional CFO value be within ±7.5 kHz are as represented in Table 5 below which are arranged for each system bandwidth.

Table 5 represents the legacy PRB indices with respect to different LTE system bandwidths.

TABLE 5

| LTE system bandwidth [MHz] | 3 | 5 | 10 | 15 | 20 |
|---|---|---|---|---|---|
| PRBs in system bandwidth | 15 | 25 | 50 | 75 | 100 |
| Legacy PRB indices | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

In this case, the NB-IoT terminal additionally receives the information of the legacy CRS from the BS through the Master Information Block (MIB) transmitted through an N-PBCH.

When the legacy CRS information is transmitted, the BS may transmit the system bandwidth and the PRB index information simultaneously to the terminal.

In the case that the system bandwidth and the PRB index information are simultaneously transmitted, total 46 cases occur as represented in Table 6 below.

Accordingly, 6 bits of the MIB are required to transmit the legacy CRS information.

Table 6 represents an example of a method for indicating the legacy CRS information (system bandwidth and PRB index) using 6 bits of the MIB.

TABLE 6

| Index | LTE system bandwidth | Legacy PRB index |
|---|---|---|
| 0 | 3 | 2 |
| 1 | 3 | 12 |
| 2 | 5 | 2 |
| 3 | 5 | 7 |
| 4 | 5 | 17 |
| 5 | 5 | 22 |
| 6 | 10 | 4 |
| 7 | 10 | 9 |
| 8 | 10 | 14 |
| 9 | 10 | 19 |
| 10 | 10 | 30 |
| 11 | 10 | 35 |
| 12 | 10 | 40 |
| 13 | 10 | 45 |
| 14 | 15 | 2 |
| 15 | 15 | 7 |
| 16 | 15 | 12 |
| 17 | 15 | 17 |
| 18 | 15 | 22 |
| 19 | 15 | 27 |
| 20 | 15 | 32 |
| 21 | 15 | 42 |
| 22 | 15 | 47 |
| 23 | 15 | 52 |
| 24 | 15 | 57 |

TABLE 6-continued

| Index | LTE system bandwidth | Legacy PRB index |
|---|---|---|
| 25 | 15 | 62 |
| 26 | 15 | 67 |
| 27 | 15 | 72 |
| 28 | 20 | 4 |
| 29 | 20 | 9 |
| 30 | 20 | 14 |
| 31 | 20 | 19 |
| 32 | 20 | 24 |
| 33 | 20 | 29 |

TABLE 6-continued

| Index | LTE system bandwidth | Legacy PRB index |
|---|---|---|
| 34 | 20 | 34 |
| 35 | 20 | 39 |
| 36 | 20 | 44 |
| 37 | 20 | 55 |
| 38 | 20 | 60 |
| 39 | 20 | 65 |
| 40 | 20 | 70 |
| 41 | 20 | 75 |
| 42 | 20 | 80 |
| 43 | 20 | 85 |
| 44 | 20 | 90 |
| 45 | 20 | 95 |

As another example of the method for transmitting the legacy CRS information, when a BS transmits the legacy CRS information to an NB-IoT terminal, it may be configured that the legacy CRS sequence index information is transmitted instead of the system bandwidth and the PRB index information.

In this case, the legacy CRS information may represent the legacy CRS sequence index information.

In the case of notifying the legacy CRS sequence index information as the legacy CRS information, the legacy CRS sequence index may be divided into 32.

That is, the BS may transmit the legacy CRS information using 5 bits of the MIB to the terminal.

This method has the same concept of the method for dividing the corresponding PRB by the frequency difference from the center frequency to the DC of the corresponding system bandwidth and transmitting the corresponding value (the frequency difference from the center frequency to the DC of the corresponding system bandwidth).

Additionally, it may be configured that the channel raster offset information described above is to be transmitted in the same way of transmitting the legacy CRS information (legacy CRS sequence index information).

That is, in Table 3 above, in the case that an index of the operation mode indicator is '0' (i.e., in-band mode when the same PCI indictor is true), it may be configured that the legacy CRS information and the channel raster offset information is simultaneously transmitted using 5 bits of the MIB, and in the case that an index of the operation mode indicator is '1' and '2', it may be configured that only the channel raster offset information is taken among the information transmitted by 5 bits of the MIB.

As such, an example of the method for transmitting the legacy CRS information and the channel raster offset information simultaneously using 5 bits of the MIB is represented as a table, as shown in Table 7 below.

The method for transmitting the legacy CRS information using Table 7 has an advantage of decreasing the bit number for transmitting the legacy CRS information within the MIB by 1 bit in comparison with the method for transmitting the legacy CRS information using Table 6.

And, in the case that an index of the operation mode indicator is '2', it may be configured that the channel raster offset information is transmitted through one of predefined four cases among 32 indices in Table 7.

For example, it may be configured that the channel raster offsets of 2.5 kHz, −7.5 kHz, 7.5 kHz and −2.5 kHz are transmitted using four indices 14, 15, 16 and 17 of Table 7, respectively.

FIG. 22 and FIG. 23 may be easily derived through Table 7.

FIGS. 22 and 23 illustrate examples of the PRB index that shares the same legacy CRS sequence index proposed in the present disclosure.

Particularly, FIG. 22 illustrates the indices of the PRB that shares the same legacy CRS sequence index among the even system bandwidth.

In addition, FIG. 22 shows an example of the system bandwidth of which channel raster offset is ±2.5 kHz.

FIG. 23 illustrates the indices of the PRB that shares the same legacy CRS sequence index among the odd system bandwidth.

In addition, FIG. 23 shows an example of the system bandwidth of which channel raster offset is ±7.5 kHz.

That is, FIG. 22 shows the case of Table 7, which is arranged (or classified) as the channel raster offset values first, and the second channel raster offset values are bound by ±2.5 kHz.

In addition, FIG. 23 shows the case that the arranged channel raster offset values are bound by ±7.5 kHz.

The 'n' values 2210 and 2310 shown in FIG. 22 and FIG. 23 mean the number of the PRB (except the PRB of which DC is pending on the center) existed at an upper side or a lower side of the DC among the total PRB numbers that are available for each system bandwidth.

In this case, an NB-IoT terminal may acquire the information of the legacy CRS by receiving the information that corresponds to frequency difference from the DC of the corresponding system bandwidth through 5 bits of the MIB.

Here, the information that corresponds to frequency difference from the DC of the corresponding system bandwidth may be represented by the legacy CRS sequence index information.

This will be described in more detail by taking an example as below.

It is assumed that a terminal receives index 15 of Table 7 from a BS through the MIB.

The meaning of receiving index 15 of Table 7 may be the same concept of receiving PRB n−5 of FIG. 23 that shows the case that the channel raster offset values are bound by ±7.5 kHz (odd system bandwidth).

In this case, the terminal may obtain the legacy CRS information, that is, the legacy CRS sequence index that may be used by using Equation 18 below.

In the example, that is, in the case of index 15, it may be known that the legacy CRS sequence index is '99'.

That is, by checking '99' through Table 7, '99' is the same as the legacy CRS sequence index value.

Here, the terminal may find out the corresponding legacy CRS sequence index value and two legacy CRS sequences belonged to the corresponding RB by including the legacy CRS sequence index value added by 1.

$$m' = (N_{RB}^{max,DL} - i) + (f_d \times 2), \ i = \begin{cases} 0 & \text{if even bandwidth} \\ 1 & \text{if odd bandwidth} \end{cases} \quad \text{[Equation 18]}$$

In Equation 18, m' represents a legacy CRS sequence index, $N_{RB}^{max,DL}$ represents the largest downlink bandwidth configuration, '110', and $f_d$ represents a relative value of the frequency difference from DC of the system information, and is '−5' in the above example.

As another example, it is assumed that a terminal receives index 17 of Table 7 from a BS through the MIB.

This is the same concept of receiving PRB n+5 of FIG. 22 that shows the case that the items are bound between the items of which channel raster offset is ±2.5 kHz (even system bandwidth).

In this case, in the same way above, the terminal may obtain the legacy CRS sequence index that may be used by using Equation 18 above.

In the example (in the case of index 17), the legacy CRS sequence index is '120'.

Referring to Table 7, '120' is the same as the legacy CRS sequence index value that corresponds to index 17. Herein, $f_d$ becomes 5.

In more detail, $f_d$ of Equation 18 above is (1) a value that relatively represents the difference from DC to the center frequency of the corresponding PRB in the case of the odd system bandwidth, (2) a value that relatively represents the difference from DC to the smaller frequency value among of a boundary value of the corresponding PRB in the case of the even system bandwidth.

For example, in the case of the odd system bandwidth, the meaning that $f_d$ is −5 represents that the position apart as much as −5*180 (kHz) from DC (7.5 kHz which is a half of a subcarrier from 0 Hz should be added) is the center frequency value of the corresponding PRB.

When this is checked using FIG. 23, it may be identified that the center frequency of the corresponding PRB is −907.5 kHz. Here, 180 kHz represents the bandwidth of 1 RB.

For another example, in the case of the even system bandwidth, the meaning that $f_d$ is 5 represents that the position apart as much as 5*180 (kHz) from the DC (7.5 kHz which is a half of a subcarrier from 0 Hz should be added) is the frequency value of the position that has the smaller frequency value among the boundary value of the corresponding PRB.

Referring to FIG. 22, it may be identified that the frequency value of the position that has the smaller frequency value among the boundary values of the corresponding PRB is 907.5 kHz.

That is, since the center frequency of the PRB is 997.5 kHz, the boundary of the position smaller as much as 180/2 kHz becomes 907.5 kHz.

As another method, in the case that an index of the operation mode indicator is 0, it may be configured that a terminal receives the legacy CRS information and the channel raster offset information simultaneously using 5 bits of the MIB from a BS.

And, in the case that an index of the operation mode indicator is not 0, it may be configured to transmit an channel raster offset indicator to a terminal using 2 bits of the MIB shown in Table 4 described above, and the remaining 3 bits may be configured as reserved bits.

TABLE 7

| Index | Legacy CRS sequence index | (LTE system bandwidth (MHz), Legacy PRB index) | Center frequency of legacy PRB - DC (kHz) | Channel raster offset (kHz) |
| --- | --- | --- | --- | --- |
| 0 | 18 | (20, 4) | −682.5 | 2.5 |
| 1 | 28 | (20, 9) | −607.5 | 2.5 |
| 2 | 38 | (20, 14) | −532.5 | 2.5 |
| 3 | 39 | (15, 2) | −525.0 | −7.5 |
| 4 | 48 | (20, 19) | −457.5 | 2.5 |
| 5 | 49 | (15, 7) | −450.0 | −7.5 |
| 6 | 58 | (20, 24) | −382.5 | 2.5 |
| 7 | 59 | (15, 12) | −375.0 | −7.5 |
| 8 | 68 | (10, 4) & (20, 29) | −307.5 | 2.5 |
| 9 | 69 | (15, 17) | −300.0 | −7.5 |
| 10 | 78 | (10, 9) & (20, 34) | −232.5 | 2.5 |
| 11 | 79 | (15, 22) | −225.0 | −7.5 |
| 12 | 88 | (10, 14) & (20, 39) | −157.5 | 2.5 |
| 13 | 89 | (5, 2) & (15, 27) | −150.0 | −7.5 |
| 14 | 98 | (10, 19) & (20, 44) | −82.5 | 2.5 |
| 15 | 99 | (3, 2) & (5, 7) & (15, 32) | −75.0 | −7.5 |
| 16 | 119 | (3, 12) & (5, 17) & (15, 42) | 75.0 | 7.5 |
| 17 | 120 | (10, 30) & (20, 55) | 82.5 | −2.5 |
| 18 | 129 | (5, 22) & (15, 47) | 150.0 | 7.5 |
| 19 | 130 | (10, 35) & (20, 60) | 157.5 | −2.5 |
| 20 | 139 | (15, 52) | 225.0 | 7.5 |
| 21 | 140 | (10, 40) & (20, 65) | 232.5 | −2.5 |
| 22 | 149 | (15, 57) | 300.0 | 7.5 |
| 23 | 150 | (10, 45) & (20, 70) | 307.5 | −2.5 |
| 24 | 159 | (15, 62) | 375.0 | 7.5 |
| 25 | 160 | (20, 75) | 382.5 | −2.5 |
| 26 | 169 | (15, 67) | 450.0 | 7.5 |
| 27 | 170 | (20, 80) | 457.5 | −2.5 |
| 28 | 179 | (15, 72) | 525.0 | 7.5 |
| 29 | 180 | (20, 85) | 532.5 | −2.5 |
| 30 | 190 | (20, 90) | 607.5 | −2.5 |
| 31 | 200 | (20, 95) | 682.5 | −2.5 |

FIG. 24 is a flowchart illustrating another example of a method for transmitting and receiving system information in the NB-IoT system proposed in the present disclosure.

First, a terminal receives a Narrowband Synchronization Signal from a BS through a narrowband (NB) (step, S2410).

The narrowband represents the system bandwidth that corresponds to 1 Physical Resource Block (PRB) of the Long Term Evolution (LTE) system.

Accordingly, the narrowband may correspond to 180 kHz.

The 1 PRB includes 12 contiguous subcarriers, and single subcarrier spacing may be 15 kHz in the case that the narrowband is 180 kHz.

The Narrowband Synchronization Signal includes a narrowband primary synchronization signal and a narrowband secondary synchronization signal.

Furthermore, the narrowband synchronization signal may be generated by using the Zadoff-Chu (ZC) sequence.

The narrowband primary synchronization signal is received from the BS through contiguous 11 subcarriers in the 1 PRB.

Later, the terminal acquires the time synchronization and the frequency synchronization with the BS based on the narrowband synchronization signal (step, S2420).

Later, the terminal receives the system information related to the NB-IoT through a Narrowband Physical Broadcast Channel (N-PBCH) from the BS (step, S2430).

The system information may be a Master Information Block (MIB).

The system information may include at least one of the operation mode information that represents an operation mode of the NB-IoT system or the control information that represents an index of the legacy CRS sequence.

Here, the control information is in relation to the Physical Resource Block (PRB) index in which the legacy CRS is transmitted.

In addition, the PRB index is in relation to the frequency difference information between the center frequency of the PRB in which the legacy CRB is transmitted and a Direct Current (DC).

Furthermore, the control information may include a channel raster offset value.

The channel raster offset value may have +2.5 kHz, +7.5 kHz, −2.5 kHz or −7.5 kHz.

The operation mode may include an In-band mode operated in the in-band, the guard-band mode operated in the guard-band and the stand-alone mode operated in stand-alone.

The in-band mode may include a first in-band mode in which the NB-IoT system and the LTE system use the same Physical Cell ID (PCI) and a second in-band mode in which the NB-IoT system and the LTE system use different Physical Cell IDs (PCIs).

In addition, in the case of the first in-band mode, the control information may be included in the system information.

Information Signaling for Additional Configured PRB

Next, the contents in relation to the PRB (or configured PRB) which is additionally allocated in the case of using a plurality of NB-IoT carriers.

As described above, in the NB-IoT system, an NB-IoT terminal (e.g., NB-IoT UE) receives (or being transmitted) an NB-PSS, an NB-SSS, an NB-PBCH and a system information block (SIB) from a BS through a specific PRB.

Here, the specific PRB is expressed as an 'anchor PRB'.

The anchor PRB may be located in the in-band, in the guard-band and in the stand-alone mode.

Meanwhile, in the NB-IoT system, a downlink transmission may use multiple NB-IoT carriers.

Accordingly, the NB-IoT terminal may be allocated with an additional PRB for the downlink transmission.

The additional PRB information may also be allocated for an uplink transmission.

Here, the additionally allocated PRB is expressed as a 'configured PRB'.

The configured PRB may also be expressed as or called a non-anchor PRB.

Considering the operation mode in the NB-IoT system, the correlation between the anchor PRB and the configured PRB may be arranged as following 5 cases ((1) to (5)).

(1) In-band anchor PRB and In-band configured PRB: represents the case that the operation mode of the anchor PRB is the in-band, and the operation mode of the configured PRB is the in-band.

(2) In-band anchor PRB and Guard band configured PRB: represents the case that the operation mode of the anchor PRB is the in-band, and the operation mode of the configured PRB is the guard-band.

(3) Guard band anchor PRB and Guard band configured PRB:

represents the case that the operation mode of the anchor PRB is the guard-band, and the operation mode of the configured PRB is the guard-band.

(4) Guard band anchor PRB and In-band configured PRB:

represents the case that the operation mode of the anchor PRB is the guard-band, and the operation mode of the configured PRB is the in-band.

(5) Stand-alone anchor PRB and Stand-alone configured PRB:

represents the case that the operation mode of the anchor PRB is the stand-alone, and the operation mode of the configured PRB is the stand-alone.

With respect to the five cases above, the NB-IoT terminal should receive signaling for the information of the configured PRB from the BS.

In this case, it may be configured that the information of the configured PRB is transmitted through a high layer (e.g., RRC signaling).

For example, the information of the configured PRB may be included in CarrierConfigDedicated-NB information elements of Table 10 that will be described below.

In this case, the information of the configured PRB may include an operation mode indicator and the same PCI indicator.

In addition, the information of the configured PRB may further include the following information according to an operation mode of each anchor PRB and an operation mode of the configured PRB.

First, in the case of case (1) (both of the operation modes of the anchor PRB and the configured PRB are the in-band mode) described above, it may be configured that the information of the configured PRB may additionally include an index information of the configured PRB.

Second, in the case of case (4) (an operation mode of the anchor PRB is the guard-band mode and an operation mode of the configured mode is the in-band mode), it may be configured that the information of the configured PRB may additionally include the frequency offset information between the anchor PRB and the DC frequency of the system bandwidth and an index information of the configured PRB.

Here, the reason why transmitting the frequency offset information between the DC frequencies of the system bandwidth is that a terminal may know a position of the configured PRB using the index information of the configured PRB only in the case that the terminal knows the DC frequency.

Last, in the case of cases (2), (3) and (5) (an operation mode of the configured PRB is the guard-band mode or the stand-alone mode), it may be configured that the information of the configured PRB may additionally include the center frequency value of the configured PRB.

This is because the configured PRB is operated in the guard-band mode or the stand-alone mode, the PRB duration is not predetermined, different from the case that the configured PRB is operated in the in-band mode.

Additionally, in the case that an operation mode in the configured PRB and an operation mode in the anchor PRB are different, it may be configured that the information on whether the PCI values that correspond to each PRB (anchor PRB and configured PRB) are the same or different may also be transmitted.

Here, the information on whether the PCI values that correspond to each PRB (anchor PRB and configured PRB) are the same or different may be expressed as the same PCI-indicator.

As an example of the method, in the case that a PCI in the anchor PRB and a PCI in the configured PRB are different, the information on whether the PCI values that correspond to each PRB are the same or different may be set to '1', and in the case that a PCI in the anchor PRB and a PCI in the configured PRB are the same, the information on whether the PCI values that correspond to each PRB are the same or different may be set to '0'.

Or, on the contrary, in the case that a PCI in the anchor PRB and a PCI in the configured PRB are different, the information on whether the PCI values that correspond to each PRB are the same or different may be set to '0', and in the case that a PCI in the anchor PRB and a PCI in the configured PRB are the same, the information on whether the PCI values that correspond to each PRB are the same or different may be set to '1'.

Next, a method for transmitting the index information of the configured PRB will be described in more detail.

As the first method for transmitting the index information of the configured PRB, it may be configured that the difference between the center frequency of the anchor PRB and the center frequency of the configured PRB, that is, the center frequency difference information is transmitted to an NB-IoT terminal.

Since the NB-IoT terminal synchronized with the anchor PRB already knows the index information of the anchor PRB, the NB-IoT terminal may know the index information of the configured PRB only with the center frequency difference information.

Considering the system bandwidth of 20 MHz, the length of the index information of the configured PRB requires minimum 8 bits since about 200 center frequency difference values are existed.

As the second method, it may be configured that the frequency difference information from the center frequency of the configured PRB to DC of the corresponding system bandwidth is transmitted to the NB-IoT terminal.

In this case, the method may be divided into following two cases according to an operation mode of the anchor PRB.

First, in the case that the anchor PRB is operated in the in-band mode, it is already known that the system bandwidth of the anchor PRB is either even system bandwidth or odd system bandwidth.

Accordingly, a length of the frequency difference information which is required to the maximum requires minimum 7 bits, since 75 states are existed considering the largest 15 MHz system bandwidth among the odd system bandwidth, and 100 states are existed considering the largest 20 MHz system bandwidth among the even system bandwidth.

An example of the first method is represented as Table 8 below.

That is, Table 8 represents an example of the frequency difference value from the center frequency of the configured PRB to DC of the corresponding system bandwidth.

Second, a length of the frequency difference information which is required to the maximum in the case that the anchor PRB is operated in the guard band mode requires minimum 8 bits, since 100 frequency difference values are existed considering 20 MHz system bandwidth, and 75 frequency difference values are existed considering additional 15 MHz system bandwidth.

As another method for notifying the index information of the configured PRB, a method for notifying whether the index information is even system bandwidth or odd system bandwidth by MSB 1 bit in advance, and for notifying the PRB index using Table 8 for the remaining 7 bits may be considered.

TABLE 8

| Index | Center frequency of legacy PRB - DC (kHz) in odd system bandwidth | Center frequency of legacy PRB - DC (kHz) in even system bandwidth |
|---|---|---|
| 0 | −742.5 | −555 |
| 1 | −727.5 | −540 |
| 2 | −712.5 | −525 |
| 3 | −697.5 | −510 |
| 4 | −682.5 | −495 |
| 5 | −667.5 | −480 |
| 6 | −652.5 | −465 |
| 7 | −637.5 | −450 |
| 8 | −622.5 | −435 |
| 9 | −607.5 | −420 |
| 10 | −592.5 | −405 |
| 11 | −577.5 | −390 |
| 12 | −562.5 | −375 |
| 13 | −547.5 | −360 |
| 14 | −532.5 | −345 |
| 15 | −517.5 | −330 |
| 16 | −502.5 | −315 |
| 17 | −487.5 | −300 |
| 18 | −472.5 | −285 |
| 19 | −457.5 | −270 |
| 20 | −442.5 | −255 |
| 21 | −427.5 | −240 |
| 22 | −412.5 | −225 |
| 23 | −397.5 | −210 |
| 24 | −382.5 | −195 |
| 25 | −367.5 | −180 |
| 26 | −352.5 | −165 |
| 27 | −337.5 | −150 |
| 28 | −322.5 | −135 |
| 29 | −307.5 | −120 |
| 30 | −292.5 | −105 |
| 31 | −277.5 | −90 |
| 32 | −262.5 | −75 |
| 33 | −247.5 | −60 |
| 34 | −232.5 | −45 |
| 35 | −217.5 | −30 |
| 36 | −202.5 | −15 |
| 37 | −187.5 | 0 |
| 38 | −172.5 | 15 |
| 39 | −157.5 | 30 |
| 40 | −142.5 | 45 |
| 41 | −127.5 | 60 |
| 42 | −112.5 | 75 |
| 43 | −97.5 | 90 |
| 44 | −82.5 | 105 |
| 45 | −67.5 | 120 |
| 46 | −52.5 | 135 |
| 47 | −37.5 | 150 |
| 48 | −22.5 | 165 |
| 49 | −7.5 | −555 |
| 50 | 7.5 | 180 |
| 51 | 22.5 | 195 |
| 52 | 37.5 | 210 |
| 53 | 52.5 | 225 |
| 54 | 67.5 | 240 |
| 55 | 82.5 | 255 |
| 56 | 97.5 | 270 |
| 57 | 112.5 | 285 |
| 58 | 127.5 | 300 |
| 59 | 142.5 | 315 |
| 60 | 157.5 | 330 |
| 61 | 172.5 | 345 |
| 62 | 187.5 | 360 |
| 63 | 202.5 | 375 |
| 64 | 217.5 | 390 |
| 65 | 232.5 | 405 |
| 66 | 247.5 | 420 |
| 67 | 262.5 | 435 |
| 68 | 277.5 | 450 |
| 69 | 292.5 | 465 |
| 70 | 307.5 | 480 |
| 71 | 322.5 | 495 |
| 72 | 337.5 | 510 |
| 73 | 352.5 | 525 |
| 74 | 367.5 | 540 |
| 75 | 382.5 | — |
| 76 | 397.5 | — |
| 77 | 412.5 | — |
| 78 | 427.5 | — |
| 79 | 442.5 | — |
| 80 | 457.5 | — |
| 81 | 472.5 | — |
| 82 | 487.5 | — |
| 83 | 502.5 | — |
| 84 | 517.5 | — |
| 85 | 532.5 | — |
| 86 | 547.5 | — |
| 87 | 562.5 | — |
| 88 | 577.5 | — |
| 89 | 592.5 | — |
| 90 | 607.5 | — |
| 91 | 622.5 | — |
| 92 | 637.5 | — |
| 93 | 652.5 | — |
| 94 | 667.5 | — |
| 95 | 682.5 | — |
| 96 | 697.5 | — |
| 97 | 712.5 | — |
| 98 | 727.5 | — |
| 99 | 742.5 | — |

Table 9 below is an example of a radio resource control (RRC) message including the index information of the configured PRB, and particularly, represents CarrierConfigDedicated-NB information elements.

The CarrierConfigDedicated-NB Information Element (IE) is used for embodying a non-anchor carrier in the NB-IoT system.

Here, the non-anchor carrier may represent the configured carrier or the configured PRB described above.

In addition, Table 10 below represents the description of each field represented in the CarrierConfigDedicated-NB of Table 9.

TABLE 9

```
-- ASN1START
CarrierConfigDedicated-NB-r13 ::=    SEQUENCE {
    dl-CarrierConfig-r13        DL-CarrierConfigDedicated-NB-r13,
    ul-CarrierConfig-r13        UL-CarrierConfigDedicated-NB-r13
}
DL-CarrierConfigDedicated-NB-r13 ::=SEQUENCE {
    dl-CarrierFreq-r13              CarrierFreq-NB-r13,
    downlinkBitmapNonAnchor-r13     CHOICE {
        useNoBitmap-r13                 NULL,
        useAnchorBitmap-r13             NULL,
        explicitBitmapConfiguration-r13 DL-Bitmap-NB-r13,
        spare                           NULL
    }   OPTIONAL, -- Need ON
    dl-GapNonAnchor-r13             CHOICE {
        useNoGap-r13                    NULL,
        useAnchorGapConfig-r13          NULL,
        explicitGapConfiguration-r13    DL-GapConfig-NB-r13,
        spare                           NULL
    }   OPTIONAL, -- Need ON
    inbandCarrierInfo-r13           SEQUENCE {
        samePCI-Indicator-r13           CHOICE {
```

TABLE 9-continued

```
    samePCI-r13                SEQUENCE {
       indexToMidPRB-r13          INTEGER (-55..54)
    },
    differentPCI-r13           SEQUENCE {
       eutra-NumCRS-Ports-r13     ENUMERATED
                                    {same, four}
    }
  }                            OPTIONAL,  -- Cond anchor-guardband
  eutraControlRegionSize-r13   ENUMERATED {n1, n2, n3}
}                              OPTIONAL,  -- Cond non-anchor-inband
  ...
}
UL-CarrierConfigDedicated-NB-r13 ::=SEQUENCE {
  ul-CarrierFreq-r13  CarrierFreq-NB-r13  OPTIONAL,-- Need OP
  ...
}
-- ASN1STOP
```

TABLE 10

CarrierConfigDedicated-NB field descriptions dl-CarrierConfig
Downlink Carrier different from the anchor
carrier used for all unicast transmissions.
If absent, the downlink carrier is the downlink anchor carrier.
dl-CarrierFreq
DL carrier frequency. The downlink carrier is not in a E-UTRA PRB
which contains E-UTRA PSS/SSS/PBCH.
dl-GapNonAnchor
Downlink transmission gap configuration
for the non-anchor carrier, see TS 36.211
[21] and TS 36.213 [23].
downlinkBitmapNonAnchor
Nb-IoT downlink subframe configuration for downlink transmission
on the non-anchor carrier.
eutraControlRegionSize
Indicates the control region size of the
E-UTRA cell for the in-band operation mode.
Unit is in number of OFDM symbols.
If operationModeInfo in MIB-NB is set to inband-SamePCI or
inband-DifferentPCI, it should be set to the value broadcast in SIB1-NB
eutra-NumCRS-Ports
Number of E-UTRA CRS antenna ports, either the same number of
ports as NRS or 4 antenna ports. See TS 36.211 [21],
TS 36.212 [22], and TS 36.213 [23].
inbandCarrierInfo
Provides the configuration of a non-anchor inband carrier.
If absent, the configuration of the anchor carrier applies.
indexToMidPRB
The PRB index is signaled by offset from
the middle of the EUTRA system.
samePCI-Indicator
This parameter specifies whether the non-anchor carrier reuses the same
PCI as the EUTRA carrier.
ul-CarrierConfig
If absent, the uplink carrier is the uplink anchor carrier.
ul-CarrierFreq
UL carrier frequency
if absent, the same TX-RX frequency separation as for the
anchor carrier applies

TABLE 11

| Conditional presence | Explanation |
|---|---|
| non-anchor-inband | The field is optionally present, need OP, if the non-anchor carrier is an inband carrier; otherwise it is not present. |
| anchor-guardband | The field is mandatory present, if operationModeInfo is set to guardband in the MIB; otherwise it is not present. |

FIG. 25 is a flowchart illustrating an example of a method for transmitting and receiving downlink data through multiple NB-IoT carriers in the NB-IoT system proposed in the present disclosure.

First, a terminal receives a Narrowband Synchronization Signal from a BS through a first NB-IoT carrier (step, S2510).

The narrowband represents the system bandwidth that corresponds to 1 Physical Resource Block (PRB) of the Long Term Evolution (LTE) system, and 1 PRB includes 12 subcarriers.

The Narrowband Synchronization Signal includes a narrowband primary synchronization signal and a narrowband secondary synchronization signal.

The first NB-IoT carrier may be expressed by an anchor PRB.

The narrowband synchronization signal is generated by using the Zadoff-Chu (ZC) sequence.

The narrowband primary synchronization signal is received from the BS through contiguous 11 subcarriers among 12 subcarriers.

The contiguous 11 subcarriers are constructed by excluding a specific subcarrier among the 12 subcarriers.

The specific subcarrier may be a subcarrier that has the smallest subcarrier index or the greatest subcarrier index.

Later, the terminal acquires the time synchronization and the frequency synchronization with the BS based on the narrowband synchronization signal (step, S2520).

Later, the terminal receives the system information related to the NB-IoT through the first NB-IoT carrier from the BS (step, S2530).

The system information may be a Master Information Block (MIB).

The system information may include at least one of the operation mode information that represents an operation mode of the NB-IoT system or the channel raster offset indicator that represents a channel raster offset value.

The channel raster offset indicator may also be expressed by channel raster offset information.

The channel raster offset value may have +2.5 kHz, +7.5 kHz, −2.5 kHz or −7.5 kHz.

Later, the terminal is allocated with a second NB-IoT carrier from the BS (step, S2540).

Herein, the second NB-IoT carrier may also expressed by a configured PRB.

Here, the terminal may be allocated with the second NB-IoT carrier by receiving the information of the second NB-IoT carrier from the BS through high layer signaling.

The information of the second NB-IoT carrier further includes the control information related to the PRB index of the second NB-IoT carrier.

The control information may be the information that represents a frequency difference between the center frequency of the second NB-IoT carrier and the Direct Current (DC).

The control information may include 100 state values.

The information of the second NB-IoT carrier may include at least one of the information that represents an operation mode of the second NB-IoT carrier or the information that represents whether the second NB-IoT carrier uses the same Physical Cell ID (PCI) as the legacy carrier.

Later, the terminal receives the downlink data through at least one of the first NB-IoT carrier or the second NB-IoT carrier (step, S2550).

Method for configuring Legacy PRB indices for N-PSS

Next, the legacy PRB index configuration method for the N-PSS that has 11 subcarriers will be described.

In the case that a Narrowband Primary Synchronization Signal (N-PSS) is transmitted through 11 subcarriers, the Carrier Frequency Offset (CFO) value additionally generated is different according to which subcarrier is excluded and the 11 subcarriers are used among the existing 12 subcarriers (1 RB) for each system bandwidth.

Considering the even system bandwidth, it is preferable that the PRBs that have the center frequency value smaller than the Direct Current are configured to transmit the N-PSS to 11 (#0 to #10) subcarriers except #11 subcarrier (2610) as shown in FIG. 26*a*. In this case, the CFO value additionally generated is 5 kHz.

As shown in FIG. 26*b*, in the case of transmitting the N-PSS to 11 (#1 to #11) subcarriers except #0 subcarrier (2620), the CFO value additionally generated is increased to 10 kHz.

Next, it is preferable that the PRBs that have the center frequency value smaller than the DC are configured to transmit the N-PSS to 11 (#1 to #11) subcarriers except #0 subcarrier (2630) as shown in FIG. 26*c*. In this case, the CFO value additionally generated is 5 kHz.

As shown in FIG. 26*d*, in the case of transmitting the N-PSS to 11 (#0 to #10) subcarriers except #11 subcarrier (2640), the CFO value additionally generated is increased to 10 kHz.

That is, FIG. 26 illustrates an example of a subcarrier selection method for transmitting the N-PSS in the even system bandwidth proposed in the present disclosure.

FIG. 27 illustrates an example of a subcarrier selection method for transmitting the N-PSS in the odd system bandwidth proposed in the present disclosure.

Considering the odd system bandwidth, it is preferable that the PRBs that have the center frequency value smaller than the DC are configured to transmit the N-PSS to 11 (#1 to #11) subcarriers except #0 subcarrier (2710) as shown in FIG. 27*a*. In this case, there is no additionally generated CFO value.

As shown in FIG. 27*b*, in the case of transmitting the N-PSS to 11 (#0 to #10) subcarriers except #11 subcarrier (2720), the CFO value additionally generated is increased to 15 kHz.

Next, it is preferable that the PRBs that have the center frequency value greater than the DC are configured to transmit the N-PSS to 11 (#0 to #10) subcarriers except #11 subcarrier (2730) as shown in FIG. 27*c*. In this case, there is no additionally generated CFO value.

As shown in FIG. 27*d*, in the case of transmitting the N-PSS to 11 (#1 to #11) subcarriers except #0 subcarrier (2740), the CFO value additionally generated is increased to 15 kHz.

The PRB indices represented in Table 5 described above may be classified and arranged as represented in Table 11 below by using the method described in FIG. 26 and FIG. 27.

For reference, the frequency value of #0 subcarrier has the greater value than the frequency value of #10 subcarrier.

That is, the meaning of the subcarrier indices are mapped in the ascending order means the subcarrier frequencies are mapped from greater values to smaller values, that is, in the descending order.

Table 12 represents the legacy PRB indices for different LTE system bandwidth.

TABLE 12

| LTE system bandwidth [MHz] | 3 | 5 | 10 | 15 | 20 |
|---|---|---|---|---|---|
| PRBs in system bandwidth | 15 | 25 | 50 | 75 | 100 |
| PRB indices with low 11-subcarriers (#0~#10) | 12 | 17, 22 | 4, 9, 14, 19 | 42, 47, 52, 57, 62, 67, 72 | 4, 9, 14, 19, 24, 29, 34, 39, 44, |
| PRB indices with high 11-subcarriers (#1~#11) | 2 | 2, 7 | 30, 35, 40, 45 | 2, 7, 12, 17, 22, 27, 32 | 55, 60, 65, 70, 75, 80, 85, 90, 95 |

Referring to Table 12, for example, when the LTE system bandwidth is 5 MHz, that is, the odd system bandwidth, the PRB indices available to transmit the N-PSS using 11 subcarriers including #0 to #10 subcarriers (the greatest subcarrier is not used) are 17 and 22, and the PRB indices available to transmit the N-PSS using 11 subcarriers including #1 to #11 subcarriers (the smallest subcarrier is not used) are 2 and 7.

FIG. 28 is a flowchart illustrating an example of a method for transmitting and receiving a narrowband synchronization signal in the NB-IoT system proposed in the present disclosure.

First, a terminal receives a Narrowband Synchronization Signal from a BS through the narrowband (NB) (step, S2810).

The narrowband represents the system bandwidth that corresponds to 1 Physical Resource Block (PRB) of the Long Term Evolution (LTE) system.

Accordingly, the narrowband may correspond to 180 kHz.

The 1 PRB includes 12 contiguous subcarriers, and in the case that the narrowband is 180 kHz, one subcarrier spacing may be 15 kHz.

The Narrowband Synchronization Signal includes a narrowband primary synchronization signal and a narrowband secondary synchronization signal.

The narrowband synchronization signal is generated by using the Zadoff-Chu (ZC) sequence.

The narrowband primary synchronization signal is received from the BS through contiguous 11 subcarriers within 1 PRB.

The contiguous 11 subcarriers are selected by excluding a specific subcarrier among the 12 subcarriers within 1 PRB, as described in FIG. 26 and FIG. 27.

Here, the specific subcarrier may correspond to a subcarrier that has the smallest subcarrier index or the greatest subcarrier index.

As described above, the excluded specific subcarrier may be selected by considering the CFO value which is additionally generated.

Later, the terminal acquires the time synchronization and the frequency synchronization with the BS based on the narrowband synchronization signal (step, S2820).

General Apparatus to which the Present Invention may be Applied

FIG. 29 illustrates a block diagram of a wireless communication apparatus according to an embodiment of the present invention.

Referring to FIG. 29, the wireless communication system includes a BS (eNB) 2910 and a plurality of terminals (UEs) 2920 located within the region of the BS 2910.

The BS 2910 includes a processor 2911, a memory 2912 and a radio frequency (RF) unit 2913. The processor 2911 implements the functions, processes and/or methods proposed in FIGS. 1 to 28 above. The layers of wireless interface protocol may be implemented by the processor 2911. The memory 2912 is connected to the processor 2911, and stores various types of information for driving the processor 2911. The RF unit 2913 is connected to the processor 2911, and transmits and/or receives radio signals.

The terminal 2920 includes a processor 2921, a memory 2922 and a RF unit 2923. The processor 2921 implements the functions, processes and/or methods proposed in FIGS. 1 to 28 above. The layers of wireless interface protocol may be implemented by the processor 2921. The memory 2922 is connected to the processor 2921, and stores various types of information for driving the processor 2921. The RF unit 2923 is connected to the processor 2921, and transmits and/or receives radio signals.

The memories 2912 and 2922 may be located interior or exterior of the processors 2911 and 2921, and may be connected to the processors 2911 and 2921 with well known means. In addition, the BS 2910 and/or the terminal 2920 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

The method has been described mainly with the example applied to 3GPP LTE/LTE-A system, but may also be applied to various wireless communication systems except the 3GPP LTE/LTE-A system.

The present disclosure has an effect of utilizing resource efficiently in the NB-IoT system by providing additional information or assistant information for using the legacy LTE CRS in the NB-IoT system.

The technical effects of the present invention are not limited to the technical effects described above, and other technical effects not mentioned herein may be understood to those skilled in the art from the description below.

What is claimed is:

1. A method for receiving system information in a wireless communication system supporting Narrow Band (NB)-Internet of Things (IoT), the method performed by a terminal and comprising:
   receiving an NB synchronization signal (NBSS) through an NB from a base station (BS);
   acquiring time synchronization and frequency synchronization with the BS based on the received NBSS; and
   receiving the system information related to the NB-IoT through an NB physical broadcast channel from the BS,
   wherein the system information includes at least operation mode information indicating an operation mode of the NB-IoT system or channel information indicating a channel raster offset.

2. The method of claim 1, wherein the operation mode is an in-band mode, a guard-band mode or a stand-alone mode.

3. The method of claim 2, wherein the in-band mode includes a first in-band mode in which the NB-IoT system and a Long Term Evolution (LTE) system have a same Physical Cell ID (PCID) and a second in-band mode in which the NB-IoT system and the LTE system have different PCIDs.

4. The method of claim 3, wherein the channel raster offset is +2.5 kHz, +7.5 kHz, −2.5 kHz or −7.5 kHz.

5. The method of claim 1, wherein the system information is a Master Information Block.

6. The method of claim 1, wherein the NB is a system bandwidth that corresponds to one Physical Resource Block (PRB) of a Long Term Evolution system.

7. The method of claim 6, wherein the one PRB includes 12 subcarriers.

8. The method of claim 1, wherein the NB synchronization signal includes an NB primary synchronization signal and an NB secondary synchronization signal.

9. The method of claim 1, wherein the NB synchronization signal is generated using a Zadoff-Chu (ZC) sequence.

10. The method of claim 7, wherein the NB primary synchronization signal is received through 11 contiguous subcarriers among the 12 subcarriers.

11. A terminal for receiving system information in a wireless communication system supporting narrowband (NB)-Internet of Things (IoT), the terminal comprising:
   a Radio Frequency (RF) unit for transmitting and receiving a radio signal; and
   a processor for:
   controlling the RF unit to receive an NB synchronization signal (NBSS) through an NB from a base station (BS);
   acquiring time synchronization and frequency synchronization with the BS based on the received NBSS; and
   controlling the RF unit to receive the system information related to the NB-IoT through an NB physical broadcast channel from the BS, wherein the system information includes at least one of operation mode information indicating an operation mode of the NB-IoT system or channel raster offset information indicating a channel raster offset.

12. The terminal of claim 11, wherein the operation mode is an in-band mode operated in an in-band, a guard-band mode operated in a guard-band or a stand-alone mode operated in stand-alone.

13. The terminal of claim 12, wherein the in-band mode includes a first in-band mode in which the NB-IoT system and a Long Term Evolution (LTE) system have a same Physical Cell ID (PCID) and a second in-band mode in which the NB-IoT system and LTE system have different PCIDs.

14. The terminal of claim 13, wherein the channel raster offset is +2.5 kHz, +7.5 kHz, −2.5 kHz or −7.5 kHz.

15. The terminal of claim 11, wherein the system information is a Master Information Block.

16. The terminal of claim 11, wherein the NB is a system bandwidth that corresponds to one Physical Resource Block (PRB) of a Long Term Evolution system.

17. The terminal of claim 16, wherein the one PRB includes 12 subcarriers.

18. The terminal of claim 11, wherein the NB synchronization signal includes an NB primary synchronization signal and an NB secondary synchronization signal.

19. The terminal of claim 11, wherein the NB synchronization signal is generated using a Zadoff-Chu (ZC) sequence.

20. The terminal of claim 17, wherein the NB primary synchronization signal is received through 11 contiguous subcarriers among the 12 subcarriers.

* * * * *